(12) United States Patent
Yun et al.

(10) Patent No.: US 11,215,572 B2
(45) Date of Patent: Jan. 4, 2022

(54) SYSTEM AND METHOD FOR X-RAY ABSORPTION SPECTROSCOPY USING A CRYSTAL ANALYZER AND A PLURALITY OF DETECTOR ELEMENTS

(71) Applicant: Sigray, Inc., Concord, CA (US)

(72) Inventors: Wenbing Yun, Walnut Creek, CA (US); Srivatsan Seshadri, Pleasanton, CA (US); Ruimin Qiao, Berkeley, CA (US); Janos Kirz, Berkeley, CA (US); Sylvia Jia Yun Lewis, San Francisco, CA (US)

(73) Assignee: Sigray, Inc., Concord, CA (US)

( * ) Notice: Subject to any disclaimer, the term of this patent is extended or adjusted under 35 U.S.C. 154(b) by 0 days.

(21) Appl. No.: 17/320,852

(22) Filed: May 14, 2021

(65) Prior Publication Data

US 2021/0356412 A1 Nov. 18, 2021

Related U.S. Application Data

(60) Provisional application No. 63/026,613, filed on May 18, 2020.

(51) Int. Cl.
*G01N 23/223* (2006.01)
*G01N 23/085* (2018.01)

(52) U.S. Cl.
CPC ......... *G01N 23/223* (2013.01); *G01N 23/085* (2018.02); *G01N 2223/041* (2013.01);
(Continued)

(58) Field of Classification Search
CPC .... G01N 23/00; G01N 23/223; G01N 23/085; G01N 23/207; G01N 23/2076;
(Continued)

(56) References Cited

U.S. PATENT DOCUMENTS 4,642,811 A 2/1987 Georgopoulos
4,945,552 A 7/1990 Ueda
(Continued)

FOREIGN PATENT DOCUMENTS

CN 1829910 A 9/2006
CN 101257851 B 9/2008
(Continued)

OTHER PUBLICATIONS

"High performance benchtop EDXRF spectrometer with Windows® ® software," published by: Rigaku Corp., Tokyo, Japan; 2017.
(Continued)

*Primary Examiner* — Jurie Yun
(74) *Attorney, Agent, or Firm* — Knobbe, Martens, Olson & Bear, LLP

(57) ABSTRACT

An apparatus includes a crystal analyzer positioned relative to an x-ray source on a Rowland circle. The crystal analyzer includes crystal planes curved along at least one direction and configured to receive x-rays from the x-ray source and to disperse the received x-rays according to Bragg's law. The apparatus further includes a spatially resolving detector that includes a plurality of x-ray detection elements having a tunable first x-ray energy and/or a tunable second x-ray energy. The plurality of x-ray detection elements are configured to measure received dispersed x-rays having x-ray energies below the first x-ray energy while suppressing measurements above the first x-ray energy and/or to measure the received dispersed x-rays having x-ray energies above the second x-ray energy while suppressing measurements below the second x-ray energy.

31 Claims, 13 Drawing Sheets

(52) U.S. Cl.
CPC . *G01N 2223/076* (2013.01); *G01N 2223/204* (2013.01); *G01N 2223/501* (2013.01)

(58) Field of Classification Search
CPC .. G01N 23/02; G01N 23/20; G01N 23/20008; G01N 23/20025; G01N 23/2204; G01N 2223/501; G01N 2223/076; G01N 2223/204; G01N 2223/041
See application file for complete search history.

(56) References Cited

U.S. PATENT DOCUMENTS

| | | | |
|---|---|---|---|
| 5,132,997 A | 7/1992 | Kojima | |
| 5,173,928 A | 12/1992 | Momose et al. | |
| 5,204,887 A | 4/1993 | Hayashida et al. | |
| 5,220,591 A | 6/1993 | Ohsugi et al. | |
| 5,249,216 A | 9/1993 | Ohsugi et al. | |
| 5,280,176 A | 1/1994 | Jach et al. | |
| 5,684,857 A | 11/1997 | Bokx | |
| 5,778,039 A | 7/1998 | Hossain | |
| 5,812,629 A | 9/1998 | Clauser | |
| 5,832,052 A | 11/1998 | Hirose et al. | |
| 5,912,940 A | 6/1999 | O'Hara | |
| 6,108,398 A | 8/2000 | Mazor et al. | |
| 6,181,773 B1 | 1/2001 | Lee et al. | |
| 6,195,410 B1 | 2/2001 | Cash, Jr. | |
| 6,226,347 B1 | 5/2001 | Golenhofen | |
| 6,381,303 B1 | 4/2002 | Vu et al. | |
| 6,430,254 B2 | 8/2002 | Wilkins | |
| 6,442,231 B1 | 8/2002 | O'Hara | |
| 6,456,688 B1 | 9/2002 | Taguchi et al. | |
| 6,504,902 B2 | 1/2003 | Iwasaki et al. | |
| 6,611,577 B1 | 8/2003 | Yamagami | |
| 6,711,234 B1 | 3/2004 | Loxley et al. | |
| 6,763,086 B2 | 7/2004 | Platonov | |
| 6,829,327 B1 | 12/2004 | Chen | |
| 6,891,627 B1 | 5/2005 | Levy et al. | |
| 6,914,723 B2 | 7/2005 | Yun et al. | |
| 6,934,359 B2 | 8/2005 | Chen | |
| 7,006,596 B1 | 2/2006 | Janik | |
| 7,023,955 B2 | 4/2006 | Chen et al. | |
| 7,095,822 B1 | 8/2006 | Yun | |
| 7,119,953 B2 | 10/2006 | Yun et al. | |
| 7,120,228 B2 | 10/2006 | Yokhin et al. | |
| 7,180,979 B2 | 2/2007 | Momose | |
| 7,183,547 B2 | 2/2007 | Yun et al. | |
| 7,187,751 B2 | 3/2007 | Kawahara et al. | |
| 7,215,736 B1 | 5/2007 | Wang et al. | |
| 7,218,703 B2 | 5/2007 | Yada et al. | |
| 7,221,731 B2 | 5/2007 | Yada et al. | |
| 7,245,696 B2 | 7/2007 | Yun et al. | |
| 7,268,945 B2 | 9/2007 | Yun et al. | |
| 7,388,942 B2 | 6/2008 | Wang et al. | |
| 7,394,890 B1 | 7/2008 | Wang et al. | |
| 7,400,704 B1 | 7/2008 | Yun et al. | |
| 7,406,151 B1 | 7/2008 | Yun | |
| 7,414,787 B2 | 8/2008 | Yun et al. | |
| 7,463,712 B2 | 12/2008 | Zhu et al. | |
| 7,486,770 B2 | 2/2009 | Baumann | |
| 7,492,871 B2 | 2/2009 | Popescu | |
| 7,499,521 B2 | 3/2009 | Wang et al. | |
| 7,515,684 B2 | 4/2009 | Gibson et al. | |
| 7,522,698 B2 | 4/2009 | Popescu | |
| 7,522,708 B2 | 4/2009 | Heismann | |
| 7,532,704 B2 | 5/2009 | Hempel | |
| 7,551,719 B2 | 6/2009 | Yokhin et al. | |
| 7,551,722 B2 | 6/2009 | Ohshima et al. | |
| 7,561,662 B2 | 7/2009 | Wang et al. | |
| 7,564,941 B2 | 7/2009 | Baumann | |
| 7,639,786 B2 | 12/2009 | Baumann | |
| 7,646,843 B2 | 1/2010 | Popescu et al. | |
| 7,653,177 B2 | 1/2010 | Baumann et al. | |
| 7,680,243 B2 | 3/2010 | Yokhin et al. | |
| 7,787,588 B1 | 8/2010 | Yun et al. | |
| 7,796,725 B1 | 9/2010 | Yun et al. | |
| 7,796,726 B1 | 9/2010 | Gendreau et al. | |
| 7,809,113 B2 | 10/2010 | Aoki et al. | |
| 7,813,475 B1 | 10/2010 | Wu et al. | |
| 7,817,777 B2 | 10/2010 | Baumann et al. | |
| 7,848,483 B2 | 12/2010 | Platonov | |
| 7,864,922 B2 | 1/2011 | Kawabe | |
| 7,889,838 B2 | 2/2011 | David et al. | |
| 7,899,154 B2 | 3/2011 | Chen et al. | |
| 7,920,676 B2 | 4/2011 | Yun et al. | |
| 7,924,973 B2 | 4/2011 | Kottler et al. | |
| 7,945,018 B2 | 5/2011 | Heismann | |
| 7,949,092 B2 | 5/2011 | Brons | |
| 7,949,095 B2 | 5/2011 | Ning | |
| 7,974,379 B1 | 7/2011 | Case et al. | |
| 7,983,381 B2 | 7/2011 | David et al. | |
| 8,005,185 B2 | 8/2011 | Popescu | |
| 8,009,796 B2 | 8/2011 | Popescu | |
| 8,009,797 B2 | 8/2011 | Ouchi | |
| 8,041,004 B2 | 10/2011 | David | |
| 8,058,621 B2 | 11/2011 | Kommareddy | |
| 8,068,579 B1 | 11/2011 | Yun et al. | |
| 8,073,099 B2 | 12/2011 | Niu et al. | |
| 8,139,711 B2 | 3/2012 | Takahashi | |
| 8,165,270 B2 | 4/2012 | David et al. | |
| 8,184,771 B2 | 5/2012 | Murakoshi | |
| 8,233,587 B2 | 7/2012 | Sato | |
| 8,243,879 B2 | 8/2012 | Itoh et al. | |
| 8,306,183 B2 | 11/2012 | Koehler | |
| 8,351,570 B2 | 1/2013 | Nakamura | |
| 8,353,628 B1 | 1/2013 | Yun et al. | |
| 8,374,309 B2 | 2/2013 | Donath | |
| 8,451,975 B2 | 5/2013 | Tada | |
| 8,513,603 B1 | 8/2013 | Lederman et al. | |
| 8,559,594 B2 | 10/2013 | Ouchi | |
| 8,559,597 B2 | 10/2013 | Chen et al. | |
| 8,565,371 B2 | 10/2013 | Bredno | |
| 8,591,108 B2 | 11/2013 | Tada | |
| 8,602,648 B1 | 12/2013 | Jacobsen et al. | |
| 8,632,247 B2 | 1/2014 | Ishii | |
| 8,755,487 B2 | 6/2014 | Kaneko | |
| 8,767,915 B2 | 7/2014 | Stutman | |
| 8,767,916 B2 | 7/2014 | Hashimoto | |
| 8,781,069 B2 | 7/2014 | Murakoshi | |
| 8,824,629 B2 | 9/2014 | Ishii | |
| 8,855,265 B2 | 10/2014 | Engel | |
| 8,859,977 B2 | 10/2014 | Kondoh | |
| 8,908,824 B2 | 12/2014 | Kondoh | |
| 8,972,191 B2 | 3/2015 | Stampanoni et al. | |
| 8,989,474 B2 | 3/2015 | Kido et al. | |
| 9,001,967 B2 | 4/2015 | Baturin | |
| 9,016,943 B2 | 4/2015 | Jacobsen et al. | |
| 9,025,725 B2 | 5/2015 | Kiyohara et al. | |
| 9,031,201 B2 | 5/2015 | Sato | |
| 9,036,773 B2 | 5/2015 | David et al. | |
| 9,063,055 B2 | 6/2015 | Ouchi | |
| 9,086,536 B2 | 7/2015 | Pang et al. | |
| 9,129,715 B2 | 9/2015 | Adler et al. | |
| 9,222,899 B2 | 12/2015 | Yamaguchi | |
| 9,230,703 B2 | 1/2016 | Mohr et al. | |
| 9,234,856 B2 | 1/2016 | Mukaide | |
| 9,291,578 B2 | 3/2016 | Adler | |
| 9,329,141 B2 | 5/2016 | Stutman | |
| 9,357,975 B2 | 6/2016 | Baturin | |
| 9,439,613 B2 | 9/2016 | Stutman | |
| 9,448,190 B2 | 9/2016 | Yun et al. | |
| 9,453,803 B2 | 9/2016 | Radicke | |
| 9,480,447 B2 | 11/2016 | Mohr et al. | |
| 9,486,175 B2 | 11/2016 | Fredenberg et al. | |
| 9,494,534 B2 | 11/2016 | Baturin | |
| 9,532,760 B2 | 1/2017 | Anton et al. | |
| 9,551,677 B2 | 1/2017 | Mazor et al. | |
| 9,557,280 B2 | 1/2017 | Pfeiffer et al. | |
| 9,570,265 B1 | 2/2017 | Yun et al. | |
| 9,588,066 B2 | 3/2017 | Pois et al. | |
| 9,594,036 B2 | 3/2017 | Yun et al. | |
| 9,632,040 B2 | 4/2017 | Stutman | |
| 9,700,267 B2 | 7/2017 | Baturin et al. | |
| 9,719,947 B2 | 8/2017 | Yun et al. | |
| 9,748,012 B2 | 8/2017 | Yokoyama | |

(56) References Cited

U.S. PATENT DOCUMENTS

| | | |
|---|---|---|
| 9,757,081 B2 | 9/2017 | Proksa |
| 9,761,021 B2 | 9/2017 | Koehler |
| 9,770,215 B2 | 9/2017 | Souchay et al. |
| 9,778,213 B2 | 10/2017 | Bakeman et al. |
| 9,823,203 B2 | 11/2017 | Yun et al. |
| 9,826,949 B2 | 11/2017 | Ning |
| 9,861,330 B2 | 1/2018 | Rossi |
| 9,874,531 B2 | 1/2018 | Yun et al. |
| 9,881,710 B2 | 1/2018 | Roessl |
| 9,916,655 B2 | 3/2018 | Sampanoni |
| 10,028,716 B2 | 7/2018 | Rossi |
| 10,045,753 B2 | 8/2018 | Teshima |
| 10,074,451 B2 | 9/2018 | Kottler et al. |
| 10,076,297 B2 | 9/2018 | Bauer |
| 10,085,701 B2 | 10/2018 | Hoshino |
| 10,141,081 B2 | 11/2018 | Preusche |
| 10,151,713 B2 | 12/2018 | Wu et al. |
| 10,153,061 B2 | 12/2018 | Yokoyama |
| 10,153,062 B2 | 12/2018 | Gall et al. |
| 10,247,683 B2 | 4/2019 | Yun et al. |
| 10,267,752 B2 | 4/2019 | Zhang et al. |
| 10,267,753 B2 | 4/2019 | Zhang et al. |
| 10,295,485 B2 | 5/2019 | Yun et al. |
| 10,304,580 B2 | 5/2019 | Yun et al. |
| 10,349,908 B2 | 7/2019 | Yun et al. |
| 10,352,695 B2 | 7/2019 | Dziura et al. |
| 10,352,880 B2 | 7/2019 | Yun et al. |
| 10,401,309 B2 | 9/2019 | Yun et al. |
| 10,416,099 B2 | 9/2019 | Yun et al. |
| 10,466,185 B2 | 11/2019 | Yun et al. |
| 10,473,598 B2 | 11/2019 | Ogata et al. |
| 10,485,492 B2 | 11/2019 | Koehler et al. |
| 10,514,345 B2 | 12/2019 | Ogata et al. |
| 10,514,346 B2 | 12/2019 | Sako |
| 10,568,588 B2 | 2/2020 | Koehler et al. |
| 10,578,566 B2 | 3/2020 | Yun et al. |
| 10,634,628 B2 | 4/2020 | Kasper et al. |
| 10,653,376 B2 | 5/2020 | Yun et al. |
| 10,697,902 B2 | 6/2020 | Sharma et al. |
| 10,782,252 B2 | 9/2020 | Gateshki et al. |
| 10,794,845 B2 | 10/2020 | Filsinger |
| 10,895,541 B2 | 1/2021 | Shchegrov et al. |
| 10,962,491 B2 | 3/2021 | Yun et al. |
| 10,976,270 B2 | 4/2021 | Wormington |
| 11,054,375 B2 * | 7/2021 | Seidler ............. G01N 23/20008 |
| 2001/0046276 A1 | 11/2001 | Schneider et al. |
| 2003/0142781 A1 | 7/2003 | Kawahara |
| 2003/0223536 A1 | 12/2003 | Yun et al. |
| 2004/0047446 A1 | 3/2004 | Platonov |
| 2005/0282300 A1 | 12/2005 | Yun et al. |
| 2006/0062350 A1 | 3/2006 | Yokhin |
| 2006/0182322 A1 | 8/2006 | Bernhardt et al. |
| 2007/0108387 A1 | 5/2007 | Yun et al. |
| 2007/0183563 A1 | 8/2007 | Baumann |
| 2007/0183579 A1 | 8/2007 | Baumann et al. |
| 2007/0189449 A1 | 8/2007 | Baumann |
| 2007/0248215 A1 | 10/2007 | Ohshima et al. |
| 2008/0084966 A1 | 4/2008 | Aoki et al. |
| 2008/0159475 A1 | 7/2008 | Mazor et al. |
| 2008/0170662 A1 | 7/2008 | Reinhold |
| 2008/0181363 A1 | 7/2008 | Fenter et al. |
| 2008/0173662 A1 | 11/2008 | Yun |
| 2009/0052619 A1 | 2/2009 | Endoh |
| 2009/0092227 A1 | 4/2009 | David |
| 2009/0154640 A1 | 6/2009 | Baumann et al. |
| 2009/0316857 A1 | 12/2009 | David et al. |
| 2010/0061508 A1 | 3/2010 | Takahashi |
| 2010/0091947 A1 | 4/2010 | Niu |
| 2010/0246765 A1 | 9/2010 | Murakoshi |
| 2010/0260315 A1 | 10/2010 | Sato et al. |
| 2010/0284513 A1 | 11/2010 | Kawabe |
| 2011/0243302 A1 | 10/2011 | Murakoshi |
| 2011/0268252 A1 | 11/2011 | Ozawa et al. |
| 2012/0041679 A1 | 2/2012 | Stampanoni |
| 2012/0224670 A1 | 9/2012 | Kiyohara et al. |
| 2012/0228475 A1 | 9/2012 | Pang et al. |
| 2013/0011040 A1 | 1/2013 | Kido et al. |
| 2013/0039460 A1 | 2/2013 | Levy |
| 2013/0108012 A1 | 5/2013 | Sato |
| 2013/0108022 A1 | 5/2013 | Kugland et al. |
| 2013/0251100 A1 | 9/2013 | Sasaki et al. |
| 2013/0308112 A1 | 11/2013 | Clube et al. |
| 2014/0023973 A1 | 1/2014 | Marconi et al. |
| 2014/0037052 A1 | 2/2014 | Adler |
| 2014/0064445 A1 | 3/2014 | Adler |
| 2014/0072104 A1 | 3/2014 | Jacobsen et al. |
| 2014/0105353 A1 | 4/2014 | Pfeiffer et al. |
| 2014/0105363 A1 | 4/2014 | Chen et al. |
| 2014/0146945 A1 | 5/2014 | Fredenberg et al. |
| 2014/0153692 A1 | 6/2014 | Larkin et al. |
| 2014/0205057 A1 | 7/2014 | Koehler et al. |
| 2014/0226785 A1 | 8/2014 | Stutman et al. |
| 2014/0270060 A1 | 9/2014 | Date et al. |
| 2015/0030126 A1 | 1/2015 | Radicke |
| 2015/0043713 A1 | 2/2015 | Chen |
| 2015/0049860 A1 | 2/2015 | Das |
| 2015/0051877 A1 | 2/2015 | Bakeman et al. |
| 2015/0055743 A1 | 2/2015 | Vedantham et al. |
| 2015/0055745 A1 | 2/2015 | Holzner et al. |
| 2015/0071402 A1 | 3/2015 | Handa |
| 2015/0117599 A1 | 4/2015 | Yun et al. |
| 2015/0243397 A1 | 8/2015 | Yun et al. |
| 2015/0247811 A1 | 9/2015 | Yun et al. |
| 2015/0260663 A1 | 9/2015 | Yun et al. |
| 2015/0270023 A1 | 9/2015 | Adler |
| 2015/0323478 A1 | 11/2015 | Stutman |
| 2015/0357069 A1 | 12/2015 | Yun et al. |
| 2016/0066870 A1 | 3/2016 | Yun et al. |
| 2016/0178541 A1 | 6/2016 | Hwang et al. |
| 2016/0206259 A1 | 7/2016 | Auclair et al. |
| 2017/0047191 A1 | 2/2017 | Yun et al. |
| 2017/0162288 A1 | 6/2017 | Yun et al. |
| 2017/0184520 A1 * | 6/2017 | Mortensen ....... G01N 23/20091 |
| 2017/0227476 A1 | 8/2017 | Zhang et al. |
| 2017/0234811 A1 | 8/2017 | Zhang et al. |
| 2017/0261442 A1 | 9/2017 | Yun et al. |
| 2017/0336334 A1 | 11/2017 | Yun et al. |
| 2018/0182131 A1 | 6/2018 | Koehler et al. |
| 2018/0202951 A1 | 7/2018 | Yun et al. |
| 2018/0261352 A1 | 9/2018 | Matsuyama et al. |
| 2018/0306734 A1 | 10/2018 | Morimoto et al. |
| 2018/0323032 A1 | 11/2018 | Strelec et al. |
| 2018/0348151 A1 | 12/2018 | Kasper et al. |
| 2019/0011379 A1 | 1/2019 | Yun et al. |
| 2019/0017946 A1 | 1/2019 | Wack et al. |
| 2019/0027265 A1 | 1/2019 | Dey et al. |
| 2019/0064084 A1 | 2/2019 | Ullom et al. |
| 2019/0086342 A1 | 3/2019 | Pois et al. |
| 2019/0115184 A1 | 4/2019 | Zalubovsky |
| 2019/0172681 A1 | 6/2019 | Owen et al. |
| 2019/0204757 A1 | 7/2019 | Brussard et al. |
| 2019/0206652 A1 | 7/2019 | Akinwande et al. |
| 2019/0212281 A1 | 7/2019 | Shchgegrov |
| 2019/0216416 A1 | 7/2019 | Koehler et al. |
| 2019/0219713 A1 | 7/2019 | Booker et al. |
| 2019/0257774 A1 | 8/2019 | Seidler et al. |
| 2019/0261935 A1 | 8/2019 | Kitamura |
| 2019/0302042 A1 | 10/2019 | Yun et al. |
| 2019/0317027 A1 | 10/2019 | Tsuboi et al. |
| 2019/0331616 A1 | 10/2019 | Schaff et al. |
| 2019/0391087 A1 | 12/2019 | Matejka et al. |
| 2020/0003712 A1 | 1/2020 | Kataoka et al. |
| 2020/0041429 A1 | 2/2020 | Cho et al. |
| 2020/0088656 A1 | 3/2020 | Pois et al. |
| 2020/0090826 A1 | 3/2020 | Adler |
| 2020/0103358 A1 | 4/2020 | Wiell et al. |
| 2020/0155088 A1 | 5/2020 | Gruener et al. |
| 2020/0158662 A1 | 5/2020 | Horiba et al. |
| 2020/0182806 A1 | 6/2020 | Kappler et al. |
| 2020/0225172 A1 | 7/2020 | Sato et al. |
| 2020/0225173 A1 | 7/2020 | Sato et al. |
| 2020/0225371 A1 | 7/2020 | Greenberg et al. |
| 2020/0232937 A1 | 7/2020 | Yaroshenko et al. |
| 2020/0279351 A1 | 9/2020 | Ratner et al. |

(56) References Cited

U.S. PATENT DOCUMENTS

| | | |
|---|---|---|
| 2020/0292475 A1 | 9/2020 | Cao et al. |
| 2020/0300789 A1 | 9/2020 | Osakabe et al. |
| 2020/0300790 A1 | 9/2020 | Gellineau et al. |
| 2020/0303265 A1 | 9/2020 | Gellineau et al. |
| 2020/0319120 A1 | 10/2020 | Kitamura et al. |
| 2020/0337659 A1 | 10/2020 | Sano et al. |
| 2020/0378905 A1 | 12/2020 | Safai |
| 2020/0378908 A1 | 12/2020 | Fujimura et al. |

FOREIGN PATENT DOCUMENTS

| | | |
|---|---|---|
| CN | 101532969 B | 9/2009 |
| CN | 101566591 A | 10/2009 |
| CN | 102325498 B | 1/2012 |
| CN | 102507623 A | 6/2012 |
| CN | 102551761 A | 7/2012 |
| CN | 103604818 A | 2/2014 |
| EP | 0751533 | 1/1997 |
| EP | 1169713 | 1/2006 |
| JP | H06-188092 | 7/1994 |
| JP | H07-194592 | 8/1995 |
| JP | H08-128971 | 5/1996 |
| JP | H08-184572 | 7/1996 |
| JP | H11-304728 | 11/1999 |
| JP | H11-352079 | 12/1999 |
| JP | 2001-021507 | 1/2001 |
| JP | 2003-149392 | 5/2003 |
| JP | 2007-218683 | 8/2007 |
| JP | 2008-200359 | 4/2008 |
| JP | 2008-145111 | 6/2008 |
| JP | 2008-197495 | 8/2008 |
| JP | 2009-195349 | 3/2009 |
| JP | 2010-032341 A | 2/2010 |
| JP | 2010-236986 | 10/2010 |
| JP | 2011-033537 | 2/2011 |
| JP | 2011-218147 | 11/2011 |
| JP | 2012-032387 | 2/2012 |
| JP | 2012-187341 | 10/2012 |
| JP | 2012-254294 | 12/2012 |
| JP | 2013-508683 | 3/2013 |
| JP | 2015-529984 | 7/2013 |
| JP | 2013-181811 | 9/2013 |
| JP | 2015-047306 | 3/2015 |
| JP | 2015-072263 | 4/2015 |
| JP | 2015-077289 | 4/2015 |
| JP | 2017-040618 | 2/2017 |
| KR | 10-2006-0088272 A | 8/2006 |
| KR | 10-2012-0091591 A | 8/2012 |
| KR | 10-2014-0059688 | 5/2014 |
| WO | WO 1998/041992 | 9/1998 |
| WO | WO 2007/125833 | 11/2007 |
| WO | WO 2008/068044 | 6/2008 |
| WO | WO 2009/104560 | 8/2009 |
| WO | WO 2011/032572 | 3/2011 |
| WO | WO 2012/032950 | 3/2012 |
| WO | WO 2013/004574 | 1/2013 |
| WO | WO 2013/111050 | 8/2013 |
| WO | WO 2013/160153 | 10/2013 |
| WO | WO 2015/066333 | 5/2015 |
| WO | WO 2015/168473 | 11/2015 |
| WO | WO 2015/176023 | 11/2015 |
| WO | WO 2015/187219 | 12/2015 |
| WO | WO 2016/187623 | 11/2016 |
| WO | WO 2017/031740 | 3/2017 |
| WO | WO 2017/213996 | 12/2017 |
| WO | WO 2018/122213 | 7/2018 |
| WO | WO 2018/175570 | 9/2018 |

OTHER PUBLICATIONS

Altapova et al., "Phase contrast laminography based on Talbot interferometry," Opt. Express, vol. 20, No. 6, (2012) pp. 6496-6508.

Bachucki et al., "Laboratory-based double X-ray spectrometer for simultaneous X-ray emission and X-ray absorption studies," J. Anal. Atomic Spectr. DOI:10.1039/C9JA00159J (2019).

Baron et al., "A compact optical design for Bragg reflections near backscattering," J. Synchrotron Rad., vol. 8 (2001), pp. 1127-1130.

Bech, "X-ray imaging with a grating interferometer," University of Copenhagen PhD. Thesis, (May 1, 2009).

Bech, "In-vivo dark-field and phase-contrast x-ray imaging," Scientific Reports 3, (2013), Article No. 03209.

Birkholz, "Chapter 4: Grazing Incidence Configurations," Thin Film Analysis by X-ray Scattering (Wiley-VCH Verlag GmbH & Co. KGaA, Weinheim, Germany, 2006).

Birnbacher et al., "Quantitative X-ray phase contrast computed tomography with grating interferometry," European J. of Nucl. Med. and Mol. Imaging, https://doi.org/10.1007/s00259-021-05259-6 (2021).

Buchanan et al., "Effective modelling of high-energy laboratory-based x-ray phase contrast imaging utilising absorption masks or gratings," J. Appl. Physics (accepted) (2020).

Chen et al., "Advance in detection of low sulfur content by wavelength dispersive XRF," Proceedings of the Annual ISA Analysis Division Symposium (2002).

Coan et al., "In vivo x-ray phase contrast analyzer-based imaging for longitudinal osteoarthritis studies in guinea pigs," Phys. Med. Biol. vol. 55(24) (2010), pp. 7649-7662.

Cohen et al., "Tunable laboratory extended x-ray absorption fine structure system," Rev. Sci. Instr. vol. 51, No. 3, Mar. 1980, pp. 273-277.

David et al., "Hard X-ray phase imaging and tomography using a grating interferometer," Spectrochimica Acta Part B vol. 62 (2007) pp. 626-630.

Davis et al., "Bridging the Micro-to-Macro Gap: A New Application for Micro X-Ray Fluorescence," Microsc Microanal., vol. 17(3) (Jun. 2011), pp. 410-417.

Diaz et al., "Monte Carlo Simulation of Scatter Field for Calculation of Contrast of Discs in Synthetic CDMAM Images," In: Digital Mammography, Proceedings 10th International Workshop IWDM 2010 (Springer Verlag, Berlin Heidelberg), (2010), pp. 628-635 (9 pages).

Dibernardo, "Non-disruptive techniques for depth profiling in photoemission spectroscopy," Nature Review Physics, https://doi.org/10.1038/s42254-021-00331-4 (2021).

Dittler et al., "A mail-in and user facility for X-ray absorption near-edge structure: the CEI-XANES laboratory X-ray spectrometer at University of Washington," J. Synch. Rad. vol. 26, eight pages, (2019).

Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).

Du et al., "Removal of artifacts caused by grating imperfections in X-ray phase contrast tomography," J. of Inst. vol. 16, P06039, doi.org/10.1088/1748-0221/16/06/P06039 (2021).

Erko et al., "X-ray Optics," Ch. 3 of "Handbook of Practical X-Ray Fluorescence Analysis," B. Beckhoff et al., eds. (Springer, Berlin, Germany, 2006), pp. 85-198.

Espes et al., "High-resolution X-ray source with advanced e-beam technology: pushing the resolution limitation for lab-scale NanoCT," Micros. Microanal., vol. 27 (Suppl. 1), pp. 1230 (2021).

Fernández-Ruiz, "TXRF Spectrometry as a Powerful Tool for the Study of Metallic Traces in Biological Systems," Development in Analytical Chemistry, vol. 1 (2014), pp. 1-14.

Gaur et al., "On the method of calibration of the energy dispersive EXAFS beamline and Indus-2 and fitting theoretical model to the EXAFS spectrum," Sadhana, vol. 36, No. 3 pp. 3390348 (2011).

Ge et al., "Investigation of the partially coherent effects in a 2D Talbot interferometer," Anal. Bioanal. Chem. vol. 401, (2011), pp. 865-870.

Graetz et al., "Lenseless C-ray Nano-Tomography down to 150 nm Resolution: On the Quantification of Modulation Transfer and Focal Spot of the Lab-based ntCT System," arXiv:2009.11749v1 [physics.ins-det] Sep. 24, 2020, 10 pages.

(56) References Cited

OTHER PUBLICATIONS

Günther et al., "Full-field structured-illumination super-resolution X-ray transmission microscopy," Nature Comm. 10:2494 (2019) and supplementary information.

Gustschin et al., "High resolution and sensitivity bi-directional x-ray phase contrast imaging using 2D Talbot array illuminators," arXiv:2105.07347v1 [physics.med-ph] May 16, 2021.

Harasse et al., "X-ray Phase Laminography with Talbot Interferometer", in Developments in X-Ray Tomography VII, Proc. SPIE vol. 7804 (2010), 780411.

Harasse et al., "Iterative reconstruction in x-ray computed laminography from differential phase measurements", Opt. Express, vol. 19 (2011), pp. 16560-16573.

Harasse et al., "X-ray Phase Laminography with a Grating Interferometer using Iterative Reconstruction", in International Workshop on X-ray and Neutron Phase Imaging with Gratings, AIP Conf. Proc. vol. 1466, (2012), pp. 163-168.

Hashimoto et al., "Improved reconstruction method for phase stepping data with stepping errors and dose fluctuations," Optics Express, vol. 28, No. 11, pp. 16363-16384 (2020).

Hemraj-Benny et al., "Near-Edge X-ray Absorption Fine Structure Spectroscopy as a Tool for Investigating Nanomaterials," Small, vol. 2(1), (2006), pp. 26-35.

Hennekam et al., "Trace metal analysis of sediment cores using a novel X-ray fluorescence core scanning method," Quaternary Int'l, https://doi.org/10.1016/j.quaint.2018.10.018 (2018).

Honma et al., Full-automatic XAFS Measurement System of the Engineering Science Research II beamline BL14B2 at Spring-8, 2011, AIP Conference Proceedings 1234, pp. 13-16.

Howard et al., "High-Definition X-ray Fluorescence Elemental Mapping of Paintings," Anal. Chem., 2012, vol. 84(7), pp. 3278-3286.

Ide-Ektessabi et al., "The role of trace metallic elements in neurodegenerative disorders: quantitative analysis using XRF and XANES spectroscopy," Anal. Sci., vol. 21(7) (Jul. 2005), pp. 885-892.

Ishisaka et al., "A New Method of Analyzing Edge Effect in Phase Contrast Imaging with Incoherent X-rays," Optical Review, vol. 7, No. 6, (2000), pp. 566-572.

Ito et al., "A Stable In-Laboratory EXAFS Measurement System," Jap. J. Appl. Phys., vol. 22, No. 2, Feb. 1, 1983, pp. 357-360.

Itoh et al., "Two-dimensional grating-based X-ray phase-contrast imaging using Fourier transform phase retrieval," Op. Express, vol. 19, No. 4 (2011) pp. 3339-3346.

Janssens et al., "Recent trends in quantitative aspects of microscopic X-ray fluorescence analysis," TrAC Trends in Analytical Chemistry 29.6 (Jun. 2010): 464-478.

Jahrman et al., "Vacuum formed temporary spherically and toroidally bent crystal analyzers for x-ray absorption and x-ray emission spectroscopy," Rev. Sci. Inst. vol. 90, 013106 (2019).

Jiang et al., "X-Ray Phase-Contrast Imaging with Three 2D Gratings," Int. J. Biomed. Imaging, (2008), 827152, 8 pages.

Kalasová et al., "Characterization of a laboratory-based X-ray computed nanotomography system for propagation-based method of phase contrast imaging," IEEE Trans. on Instr. and Meas., DOI 10.1109/TIM.2019.2910338 (2019).

Keyrilainen et al., "Phase contrast X-ray imaging of breast," Acta Radiologica, vol. 51 (8), (2010), pp. 866-884.

Kido et al., "Bone Cartilage Imaging with X-ray Interferometry using a Practical X-ray Tube", in Medical Imaging 2010: Physics of Medical Imaging, Proc. SPIE vol. 7622 (2010), 762240.

Kim, "Talbot images of wavelength-scale amplitude gratings," Opt. Express vol. 20(5), (2012), pp. 4904-4920.

Kim et al., "Observation of the Talbot Effect at Beamline 6C Bio Medical Imaging of the Pohang Light Source-II," J. Korean Phys. Soc., vol. 74, No. 10, pp. 935-940 (May 2019).

Kim et al., "A Simulation Study on the Transfer Characteristics of the Talbot Pattern Through Scintillation Screens in the Grating Interferometer," J. Rad. Sci. and Tech. 42(1), pp. 67-75 (2019).

Kiyohara et al., "Development of the Talbot-Lau Interferometry System Available for Clinical Use", in International Workshop on X-ray and Neutron Phase Imaging with Gratings, AIP Cong. Proc. vol. 1466, (2012), pp. 97-102.

Klockenkämper et al., "7.1 Instrumental Developments" and "7.3 Future Prospects by Combinations," from Chapter 7 of Total Reflection X-ray Fluorescence Analysis and Related Methods 2nd Ed. (J. Wiley and Sons, Hoboken, NJ, 2015).

Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).

Kottler et al., "A two-directional approach for grating based differential phase contrast imaging using hard x-rays," Opt. Express vol. 15(3), (2007), pp. 1175-1181.

Kottler et al., "Dual energy phase contrast x-ray imaging with Talbot-Lau interferometer," J. Appl. Phys. vol. 108(11), (2010), 114906.

Kulow et al., "On the Way to Full-Field X-ray Fluorescence Spectroscopy Imaging with Coded Apertures," J. Anal. At. Spectrom. Doi: 10.1039/C9JA00232D (2019).

Kuwabara et al., "Hard-X-ray Phase-Difference Microscopy with a Low-Brilliance Laboratory X-ray Source", Appl. Phys. Express vol. 4 (2011) 062502.

Lei et al., "8-inch-diameter field of view for X-ray differential phase-contrast imaging," Nucl. Inst. and Methods in Physics Research A, https://doi.org/10.1016/j.nima.2021.165375 (2021).

Li et al., "X-ray phase-contrast imaging using cascade Talbot-Lau interferometers," Proc. SPIE 10964 (2018), p. 1096469-1-1096469-6.

Lin et al., "Quasi-Monte Carlo method for calculating X-ray scatter in CT," Op. Express, vol. 29, No. 9, p. 13746 (2021).

Lohmann et al., "An interferometer based on the Talbot effect," Optics Communications vol. 2(1971), pp. 413-415.

Lübcke et al., "Soft X-ray nanoscale imaging using a sub-pixel resolution charge coupled device (CCD) camera," Rev. Sci. Instrum. vol. 90, 043111 (2019).

Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879, (2019).

Malzer et al., "A laboratory spectrometer for high throughput X-ray emission spectroscopy in catalysis research," Rev. Sci. Inst. 89, 113111 (2018).

Mamyrbayev et al., "Staircase array of inclined refractive multilenses for large field of view pixel super-resolution scanning transmission hard X-ray microscopy," J. Synch. Rad., vol. 28 https://doi.org/10.1107/S1600577521001521 (2021).

Matsuyama et al., "Wavefront measurement for a hard-X-ray nanobeam using singlegrating interferometry", Opt Express vol. 20 (2012), pp. 24977-24986.

Menzies et al., "Dual source X-ray and electron SEM system: Elemental mapping of an Epithermal gold-bearing sample from Karangahake, New Zealand," Microsc. Microanal., vol. 27 (Suppl. 1), pp. 456 (2021).

Miao et al., "Motionless phase stepping in X-ray phase contrast imaging with a compact source," Proceedings of the National Academy of Sciences, vol. 110(48), (2013), pp. 19268-19272.

Mijovilovich et al., "Analysis of trace metal distribution in plants with lab-based microscopic X-ray fluorescence imaging," Plant Methods, vol. 16, No. 82, 21 pages (2020).

Mizutani et al., X-ray microscopy for neural circuit reconstruction in 9th International Conference on X-Ray Microscopy, J. Phys: Conf. Ser. 186 (2009) 012092.

Modregger et al., "Grating-Based X-ray Phase Contrast Imaging," Ch. 3 of Emerging Imaging Technologies in Medicine, M. Anastasio & P. La Riviere, ed., CRC Press, Boca Raton, FL, (2012), pp. 43-56.

Momose et al., "Phase-Contrast X-Ray Imaging Using an X-Ray Interferometer for Biological Imaging", Analytical Sciences vol. 17 Supplement (2001), pp. i527-i530.

Momose et al., "Demonstration of X-Ray Talbot Interferometry", Jpn. J. Appl. Phys. vol. 42 (2003), pp. L866-L868.

(56) References Cited

OTHER PUBLICATIONS

Momose et al., "Phase Tomography Using an X-ray Talbot Interferometer", in Developments in X-Ray Tomography IV, Proc. SPIE vol. 5535 (2004), pp. 352-360.
Momose, "Recent Advances in X-ray Phase Imaging", Jpn. J. Appl. Phys. vol. 44 (2005), pp. 6355-6367.
Momose et al., "Biomedical Imaging by Talbot-Type X-Ray Phase Tomography" in Developments in X-Ray Tomography V, Proc. SPIE vol. 6318 (2006) 63180T.
Momose et al., "Phase Tomography by X-ray Talbot Interferometry for Biological Imaging" Jpn. J. Appl. Phys. vol. 45 2006 pp. 5254-5262.
Momose et al., "X-ray Talbot Interferometry with Capillary Plates", Jpn. J. Appl. Phys. vol. 45 (2006), pp. 314-316.
Momose et al., "Phase Imaging with an X-ray Talbot Interferometer", Advances in X-ray Analysis vol. 49(3) (2006), pp. 21-30.
Momose et al., "Phase Tomography Using X-ray Talbot Interferometer", in Synchrotron Radiation Instrumentation: Ninth International Conference, AIP Conf. Proc. vol. 879 (2007), pp. 1365-1368.
Momose et al., "Sensitivity of X-ray Phase Imaging Based on Talbot Interferometry", Jpn. J. Appl. Phys. vol. 47 (2008), pp. 8077-8080.
Momose et al., "Grating-Based X-ray Phase Imaging Using Multiline X-ray Source", Jpn. J. Appl. Phys. vol. 48 (2009), 076512.
Momose et al., "X-ray phase tomography with a Talbot interferometer in combination with an X-ray imaging microscope", in 9th International Conference on X-Ray Microscopy, J. Phys: Conf. Ser. 186 (2009) 012044.
Momose et al., "High-speed X-ray phase imaging and X-ray phase tomography with Talbot interferometer and white synchrotron radiation", Opt. Express vol. 17 (2009), pp. 12540-12545.
Momose et al., "X-Ray Phase Imaging with Talbot Interferometry", in "Biomedical Mathematics: Promising Directions in Imaging, Therapy Planning, and Inverse Problems", Y. Censor, M. Jiang & G.Wang, eds. (Medical Physics Publishing, Madison, WI, USA, 2010), pp. 281-320.
Momose et al., "X-ray Phase Measurements with Talbot Interferometry and Its Applications", in International Conference on Advanced Phase Measurement Methods in Optics and Imaging, AIP Conf. Proc. vol. 1236 (2010), pp. 195-199.
Momose et al., "X-ray Phase Imaging Using Lau Effect", Appl. Phys. Express vol. 4 (2011) 066603.
Momose et al., "Four-dimensional X-ray phase tomography with Talbot interferometry and white synchrotron radiation: dynamic observation of a living worm", Opt. Express vol. 19 (2011), pp. 8423-8432.
Momose et al., "X-ray Phase Imaging—From Static Observation to Dynamic Observation—", in International Workshop on X-ray and Neutron Phase Imaging with Gratings AIP Conf. Proc. vol. 1466, (2012), pp. 67-77.
Momose et al., "Recent Progress in X-ray and Neutron Phase Imaging with Gratings," Quantum Beam Science, vol. 4, No. 9; doi:10.3390/qubs4010009 (2020).
Morimoto et al., "X-ray phase contrast imaging by compact Talbot-Lau interferometer with a signal transmission grating," 2014, Optics Letters, vol. 39, No. 15, pp. 4297-4300.
Morimoto et al., "Design and demonstration of phase gratings for 2D single grating interferometer," Optics Express vol. 23, No. 23, 29399 (2015).
Munro et al., Design of a novel phase contrast imaging system for mammography, 2010, Physics in Medicine and Biology, vol. 55, No. 14, pp. 4169-4185.
Nango et al., "Talbot-defocus multiscan tomography using the synchrotron X-ray microscope to study the lacuno-canalicular network in mouse bone", Biomed. Opt. Express vol. 4 (2013), pp. 917-923.
Neuhausler et al., "Non-destructive high-resolution X-ray imaging of ULSI microelectronics using keV X-ray microscopy in Zernike phase contrast," Microelectronic Engineering, Elsevier Publishers BV., Amsterdam, NO, vol. 83, No. 4-9 (Apr. 1, 2006) pp. 1043-1046.

Newville, "Fundamentals of XAFS," (Univ. of Chicago, Chicago, IL, Jul. 23, 2004).
Nykanen et al., "X-ray scattering in full-field digital mammography," Med. Phys. vol. 30(7), (2003), pp. 1864-1873.
Oji et al., Automatic XAFS measurement system developed at BL14B2 in SPring-8, Available online Nov. 15, 2011, Journal of Synchrotron Radiation, vol. 19, pp. 54-59.
Olbinado et al., "Demonstration of Stroboscopic X-ray Talbot Interferometry Using Polychromatic Synchrotron and Laboratory X-ray Sources", Appl. Phys. Express vol. 6 (2013), 096601.
Ortega et al., "Bio-metals imaging and speciation in cells using proton and synchrotron radiation X-ray microspectroscopy," J. Royal Society Interface vol. 6 suppl. 5 (Oct. 6, 2009), p. 6S649-6S658.
Pandeshwar et al., "Modeling of beam hardening effects in a dual-phase X-ray grading interferometer for quantitative dark-field imaging," Optics Express, vol. 28, No. 13, Jun. 22, 2020, p. 19187-19204 (2020).
Parrill et al., "GISAXS—Glancing Incidence Small Angle X-ray Scattering," Journal de Physique IV, vol. 3 (Dec. 1993), pp. 411-417.
Paunesku et al., "X-Ray Fluorescence Microprobe Imaging in Biology and Medicine," J. Cell. Biochem. vol. 99, pp. 1489-1502 (2006).
Pfeiffer et al., "Phase retrieval and differential phase-contrast imaging with low-brilliance X-ray sources," Nature Physics vol. 2, (2006), pp. 258-261.
Pfeiffer et al., "Hard x-ray phase tomography with low brilliance x-ray sources," Phys. Rev. Lett. vol. 98, (2007), 108105.
Pfeiffer et al., "Hard-X-ray dark-field imaging using a grating interferometer," Nature Materials vol. 7, (2008), pp. 134-137.
Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.
Pianetta et al., "Application of synchrotron radiation to TXRF analysis of metal contamination on silicon wafer surfaces," Thin Solid Films, vol. 373(1-2), 2000, pp. 222-226.
Potts, "Electron Probe Microanalysis", Ch. 10 of "A Handbook of Silicate Rock Analysis" (Springer Science + Business Media, New York, 1987), pp. 326-382 (equation quoted from p. 336).
Prewitt et al., "Focused ion beam repair: staining of photomasks and reticles," J. Phys. D Appl. Phys. vol. 26 (1993), pp. 1135-1137.
Prewitt et al., "Gallium Staining in FIB Repair of Photomasks," Microelectronic Engineering, vol. 21 (1993), pp. 191-196.
Prewitt et al., "FIB Repair of 5X Reticles and Effects on IC Quality," Integrated Circuit Metrology, Inspection, and Process Control VII, Proc. SPIE vol. 1926 (1993), pp. 517-526.
Pushie et al., "Prion protein expression level alters regional copper, iron and zinc content in the mouse brain," Metallomics vol. 3, 206-214 (2011).
Pushie et al., "Elemental and Chemically Specific X-ray Fluorescence Imaging of Biological Systems," Chem. Rev. 114:17, 8499-8541 (2014).
Qiao et al., "Single-shot x-ray phase-contrast and dark-field imaging based on coded binary phase mask," Appl. Phys. Lett. 119, 011105 (2021).
Qin et al., "Trace metal imaging with high spatial resolution: Applications in biomedicine," Metallomics, vol. 3 (Jan. 2011), pp. 28-37.
Redus et al., "Spectrometer configuration and measurement uncertainty in X-ray spectroscopy," X-Ray Spectrom., pp. 1-14 (2020).
Renaud et al., "Probing surface and interface morphology with Grazing Incidence Small Angle X-ray Scattering," Surface Science Reports, vol. 64:8 (2009), pp. 255-380.
Rix et al., "Super-Resolution X-ray phase-contrast and dark-field imaging with a single 2D grating and electromagnetic source stepping," Phys. Med. Biol. In press https://doi.org/10.1088/1361-6560/ab2ff5 (2019).
Rutishauser, "X-ray grating interferometry for imaging and metrology," 2003, Eth Zurich, Diss. ETH No. 20939.

(56) References Cited

OTHER PUBLICATIONS

Sato et al., Two-dimensional gratings-based phase-contrast imaging using a conventional x-ray tube, 2011, Optics Letters, vol. 36, No. 18, pp. 3551-3553.
Scherer et al., "Bi-Directional X-Ray Phase-Contrast Mammography," PLoS One, vol. 9, Issue 5 (May 2014) e93502.
Scholze et al., "X-ray Detectors and XRF Detection Channels," Ch. 4 of "Handbook of Practical X-Ray Fluorescence Analysis," B. Beckhoff et al., eds. (Springer, Berlin Heidelberg, Germany, 2006), pp. 85-198.
Schunck et al., "Soft x-ray imaging spectroscopy with micrometer resolution," Optica vol. 8, No. 2, pp. 156-160 (2021).
Seifert et al., "Talbot-Lau x-ray phase-contrast setup for fast scanning of large samples," Sci. Rep. 9:4199, pp. 1-11 (2019).
Shi et al., "Laboratory X-ray interferometry imaging with a fan-shaped source grating," Optics Lett., doi.org/10.1364/OL.426867 (2021).
Shimura et al., "Hard x-ray phase contrast imaging using a tabletop Talbot-Lau interferometer with multiline embedded x-ray targets", Opt. Lett. vol. 38(2) (2013), pp. 157-159.
Sparks Jr., "X-ray Fluorescence Microprobe for Chemical Analysis," in Synchrotron Radiation Research, H. Winick & S. Doniach, eds. (Plenum Press, New York, NY 1980), pp. 459-512.
Stampanoni et al., "The First Analysis and Clinical Evaluation of Native Breast Tissue Using Differential Phase-Contrast Mammography," Investigative Radiology, vol. 46, pp. 801-806. pub2011-12-xx.
Streli et al., "Micro-X-ray fluorescence spectroscopy," Chapter I.9.f of "Imaging Modalities for Biological and Preclinical Research: A compendium, vol. 1, Part I: Ex vivo biological imaging," Ed. Walter et al., 8 pages, doi:10.1088/978-0-7503-3059-6ch42 (2021).
Sunday et al., "X-ray Metrology forthe Semiconductor Industry Tutorial," J. Res. Nat'l Inst. Stan. vol. 124: 124003 (2019); https://doi.org/10.6028/jres.124.003.
Takeda et al., "X-Ray Phase Imaging with Single Phase Grating", Jpn. J. Appl. Phys. vol. 46 (2007), pp. L89-L91.
Takeda et al., "Differential Phase X-ray Imaging Microscopy with X-ray Talbot Interferometer" Appl. Phys. Express vol. 1 (2008) 117002.
Talbot, "Facts relating to optical science No. IV," Philos. Mag. vol. 9 (1836), pp. 401-407.
Tanaka et al., "Cadaveric and in vivo human joint imaging based on differential phase contrast by X-ray Talbot-Lau interferometry", Z. Med. Phys. vol. 23 (2013), pp. 222-227.
Tao et al., "Factors Affecting the Spatial Resolution in 2D Grating-Based X-Ray Phase Contrast Imaging," Frontiers in Physics, doi: 10.3389/fphy.2021.672207 (2021).
Taphorn et al., "Grating-based spectral X-ray dark-field imaging for correlation with structural size measures," Sci. Reports, vol. 10, 13195 (2020).
Terzano et al., Recent advances in analysis of trace elements in environmental samples by X-ray based techniques (IUPAC Technical Report), Pure Appl. Chem. 2019.
Titus et al., "Advancing the in-situ characterization of light elements via X-ray absorption spectroscopy using superconducting detectors," Microsc. Microanal., vol. 27, (Suppl. 1), pp. 2890 (2021).
Tkachuk et al., "High-resolution x-ray tomography using laboratory sources", in Developments in X-Ray Tomography V, Proc. SPIE 6318 (2006): 631810.
Tkachuk et al., "Multi-length scale x-ray tomography using laboratory and synchrotron sources", Microsc. Microanal. vol. 13 (Suppl. 2) (2007), pp. 1570-1571.
Töpperwien et al., "Multiscale x-ray phase-contrast tomography in a mouse model of transient focal cerebral ischemia," Biomed. Op. Express, vol. 10, No. 1, Jan. 2019, pp. 92-103.
Tsuji et al., "X-Ray Spectrometry: Recent Technological Advances," John Wiley & Sons Ltd. Chichester, West Susses, UK 2004), Chapters 1-7.
Udagawa, "An Introduction to In-House EXAFS Facilities," The Rigaku Journal, vol. 6, (1) (1989), pp. 20-27.

Udagawa, "An Introduction to X-ray Absorption Fine Structure," The Rigaku Journal, vol. 11(2)(1994), pp. 30-39.
Uehara et al., "Effectiveness of X-ray grating interferometry for non-destructive inspection of packaged devices", J. Appl. Phys. vol. 114 (2013), 134901.
Viermetz et al., "High resolution laboratory grating-based X-ray phase-contrast CT," Scientific Reports 8:15884 (2018).
Vila-Comamala et al., "High sensitivity X-ray phase contrast imaging by laboratory grating-based interferometry at high Talbot order geometry," Op. Express vol. 29, No. 2, pp. 2049-2064 (2021).
Vogt, "X-ray Fluorescence Microscopy: A Tool for Biology, Life Science and Nanomedicine," Presentation on May 16, 2012 at James Madison Univ., Harrisonburg, VA (31 slides), 2012.
Wan et al.,"Fabrication of Multiple Slit Using Stacked-Sliced Method for Hard X-ray Talbot—Lau Interferometer", Jpn. J. Appl. Phys. vol. 47 (2008), pp. 7412-7414.
Wang et al., "Advantages of intermediate X-ray energies in Zernike phase contrast X-ray microscopy," Biotech. Adv., vol. 31 (2013) pp. 387-392.
Weitkamp et al., "Hard X-ray phase imaging and tomography with a grating interferometer," Proc. SPIE vol. 5535, (2004), pp. 137-142.
Weitkamp et al., "X-ray phase imaging with a grating interferometer," Opt. Express vol. 13(16), (2005), pp. 6296-6304.
Weitkamp et al., "X-ray wavefront analysis and optics characterization with a grating interferometer," Appl. Phys. Lett. vol. 86, (2005), 054101.
Weitkamp et al., Tomography with grating interferometers at low-brilliance sources, 2006, SPIE, vol. 6318, pp. 0S-1 to 0S-10.
Weitkamp et al., "X-ray wavefront diagnostics with Talbot interferometers," International Workshop on X-Ray Diagnostics and Scientific Application of the European XFEL, Ryn, Poland, (2010), 36 slides.
Weitkamp et al., "Design aspects of X-ray grating interferometry," in International Workshop on X-ray and Neutron Phase Imaging with Gratings AIP Conf. Proc. vol. 1466, (2012), pp. 84-89.
Wen et al., "Fourier X-ray Scattering Radiography Yields Bone Structural Information," Radiology, vol. 251 (2009) pp. 910-918.
Wen et al., "Single-shot x-ray differential phase-contrast and diffraction imaging using two-dimensional transmission gratings," Op. Lett. vol. 35, No. 12, (2010) pp. 1932-1934.
Wilde et al., "Modeling of an X-ray grating-based imaging interferometer using raytracing," Op. Express vol. 28, No. 17, p. 24657 (2020).
Withers et al., "X-ray computed tomography," Nature Reviews | Methods Primers, vol. 1, No. 18, pp. 1-21 (2021).
Witte et al., "From 2D STXM to 3D Imaging: Soft X-ray Laminography of Thin Specimens," Nano Lett. vol. 20, pp. 1305-1314 (2020).
Wittry et al., "Properties of fixed-position Bragg diffractors for parallel detection of x-ray spectra," Rev. Sci. Instr. vol. 64, pp. 2195-2200 (1993).
Wobrauschek et al., "Micro XRF of light elements using a polycapillary lens and an ultrathin window Silicon Drift Detector inside a vacuum chamber," 2005, International Centre for Diffraction Data 2005, Advances in X-ray Analysis, vol. 48, pp. 229-235.
Wobrauschek et al., "Energy Dispersive, X-Ray Fluorescence Analysis," Encyclopedia of Analytical Chemistry, R.A. Meyers, Ed. (Wiley 2010).
Yamada et al., "Compact full-field hard x-ray microscope based on advanced Kirkpatrick-Baez mirrors," Optica, vol. 7, No. 4 pp. 367-370 (2020).
Yashiro et al., "Optimal Design of Transmission Grating for X-ray Talbot Interferometer", Advances in X-ray Analysis vol. 49(3) (2006), pp. 375-379.
Yashiro et al., "Efficiency of capturing a phase image using cone-beam x-ray Talbot interferometry", J. Opt. Soc. Am. A vol. 25 (2008), pp. 2025-2039.
Yashiro et al., "Hard-X-Ray Phase-Difference Microscopy Using a Fresnel Zone Plate and a Transmission Grating", Phys. Rev. Lett. vol. 103 (2009), 180801.
Yashiro et al., "Hard x-ray phase-imaging microscopy using the self-imaging phenomenon of a transmission grating", Phys. Rev. A vol. 82 (2010), 043822.

(56) References Cited

OTHER PUBLICATIONS

Yashiro et al., "On the origin of visibility contrast in x-ray Talbot interferometry", Opt. Express (2010), pp. 16890-16901.

Yashiro et al., "X-ray Phase Imaging Microscopy using a Fresnel Zone Plate and a Transmission Grating", in The 10th International Conference on Synchrotron Radiation Instrumentation, AIP Conf. Proc. vol. 1234 (2010), pp. 473-476.

Yashiro et al., "Distribution of unresolvable anisotropic microstructures revealed in visibility-contrast images using x-ray Talbot interferometry", Phys. Rev. B vol. 84 (2011), 094106.

Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.

Yashiro et al., "Theoretical Aspect of X-ray Phase Microscopy with Transmission Gratings" in International Workshop on X-ray and Neutron Phase Imaging with Gratings, AIP Conf. Proc. vol. 1466, (2012), pp. 144-149.

Yoshioka et al., "Imaging evaluation of the cartilage in rheumatoid arthritis patients with an x-ray phase imaging apparatus based on Talbot-Lau interferometry," Scientific Reports, 10:6561, https://doi.org/10.1038/s41598-020-63155-9 (2020).

Zan et al., "High-resolution multicontrast tomography with an X-ray microarray anode-structured target source," PNAS, doi.org10.1073/pnas.2103126118 (2021).

Zanette et al., "Two-Dimensional X-Ray Grating interferometer," Phys. Rev. Lett. vol. 105 (2010) pp. 248102-1 248102-4.

Zeeshan et al., "In-house setup for laboratory-based x-ray absorption fine structure spectroscopy measurements," Rev. Sci. Inst. 90, 073105 (2019).

Zeng et al., "Glass Monocapillary X-ray Optics and Their Applications in X-Ray Microscopy," X-ray Optics and Microanalysis: Proceedings of the 20th International Congress, AIP Conf. Proc. vol. 1221, (2010), pp. 41-47.

Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.

Zhang et al., "Measurement of the inner diameter of monocapillary with confocal X-ray scattering technology based on capillary X-ray optics," Appl. Opt. (Jan. 8, 2019), doc ID 351489, pp. 1-10.

Zhou et al., "X-ray wavefront characterization with grating interferometry using an x-ray microfocus laboratory source," Proceedings, vol. 11492, Advances in Metrology forX-Ray and EUV Optics IX; 114920Q, https://doi.org/10.1117/12.2576152 (2020).

* cited by examiner

SYSTEM AND METHOD FOR X-RAY ABSORPTION SPECTROSCOPY USING A CRYSTAL ANALYZER AND A PLURALITY OF DETECTOR ELEMENTS

CLAIM OF PRIORITY

This application claims the benefit of priority to U.S. Provisional Appl. No. 63/026,613 filed on May 18, 2020 and incorporated in its entirety by reference herein.

BACKGROUND

Field

The present application relates generally to x-ray absorption spectroscopy systems.

Description of the Related Art

X-ray absorption spectroscopy (XAS) is a widely used technique for determining the local atomic geometric and/or electronic states of matter. XAS data is typically obtained by tuning the photon energy, often using a crystalline monochromator, to a range where core electrons can be excited (1-30 keV). The edges are, in part, named by which core electron is excited: the principal quantum numbers n=1, 2, and 3, correspond to the K-, L-, and M-edges, respectively. For instance, excitation of a 1s electron occurs at the K-edge, while excitation of a 2s or 2p electron occurs at an L-edge.

XAS measures the x-ray absorption response of an element in a material matrix over an energy range across one of the absorption edge(s) of the element, including the K-, L-, and M-edges, respectively. There are three main spectral regions in a XAS spectrum: 1) The pre-edge spectral region before the peak absorption energy (white line); 2) The X-ray Absorption Near-Edge Structure (XANES) region, also called NEXAFS (Near-edge X-ray Absorption Fine Structure) in the energy range from about 10 eV up to about 150 eV above the white line and 3) EXAFS (Extended X-ray Absorption Fine Structure) region in the energy range up to 1000 eV above and including the absorption edge.

Transmission mode XAS measures x-rays transmitted through an object containing the element of interest. XAS spectra are measured with sufficiently high x-ray energy resolution, (e.g., ranging from 0.3 eV to 10 eV), depending on the spectral region of a XAS spectrum and the energy of the absorption edge. For an x-ray source emitting x-rays over a wide energy bandwidth, a single crystal analyzer is typically used to select a narrow energy bandwidth according to Bragg's law:

$$2d \cdot \sin \theta = n\lambda \quad (1)$$

where d is the lattice spacing of the crystal analyzer, $\theta$ is the Bragg angle, n is an integer, and $\lambda$ is the wavelength of x-rays that satisfies Bragg's law. X-rays of wavelengths equal to $\lambda/n$ diffracted by higher Miller index crystal planes of a crystal analyzer are referred to as high order harmonics. Additionally, lower Miller index crystal planes with larger d-spacing reflect x-rays with proportionally large wavelength(s), referred to as low order harmonics.

SUMMARY

In certain implementations described herein, an apparatus comprises an x-ray source comprising a target configured to generate x-rays upon bombardment by electrons. The apparatus further comprises a crystal analyzer positioned relative to the x-ray source on a Rowland circle in a tangential plane and having a Rowland circle radius (R). The crystal analyzer comprises crystal planes curved along at least one direction within at least the tangential plane with a radius of curvature substantially equal to twice the Rowland circle radius (2R). The crystal planes are configured to receive x-rays from the x-ray source and to disperse the received x-rays according to Bragg's law. The apparatus further comprises a spatially resolving detector configured to receive at least a portion of the dispersed x-rays. The spatially resolving detector comprises a plurality of x-ray detection elements having a tunable first x-ray energy and/or a tunable second x-ray energy. The plurality of x-ray detection elements are configured to measure received dispersed x-rays having x-ray energies below the first x-ray energy while suppressing measurements of the received dispersed x-rays above the first x-ray energy and/or to measure the received dispersed x-rays having x-ray energies above the second x-ray energy while suppressing measurements of the received dispersed x-rays below the second x-ray energy. The first and second x-ray energies are tunable in a range of 1.5 keV to 30 keV.

In certain implementations described herein, a fluorescence mode x-ray absorption spectroscopy apparatus comprises a source of x-rays, a crystal, and a detector. The source and the crystal define a Rowland circle. The apparatus is configured to receive a sample at a focal point of the Rowland circle with the detector facing a surface of the sample.

In certain implementations described herein, a method comprises collecting an XANES spectrum. The method further comprises collecting an EXAFS spectrum having coarser resolution than does the XANES spectrum. The EXAFS spectrum overlaps the XANES spectrum in an energy region of at least 30 eV. The method further comprises normalizing the XANES spectrum and the EXAFS spectrum to one another in the energy region and replacing the EXAFS spectrum in the energy region with the XANES spectrum in the energy region to generate a combined spectrum.

DETAILED DESCRIPTION

Overview

Figure 1:
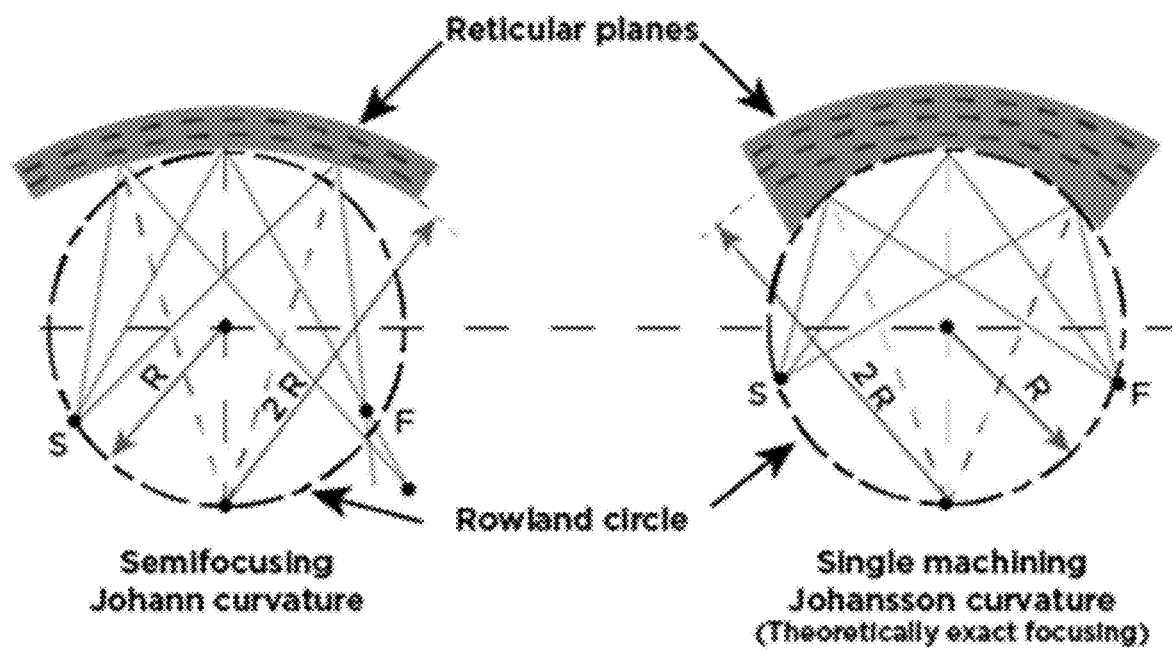
FIG. 1 schematically illustrates two types of crystal analyzers: Johann crystal analyzers (left) and Johansson crystal analyzers (right).

There are several challenges for XAS systems that use a laboratory x-ray source for high quality and high throughput XAS measurement. These challenges are largely rooted in the laboratory x-ray source and existing XAS system designs. The challenges associated with the x-ray source include:

low x-ray source brightness that leads to long measurement times, large x-ray source spot size that necessitates crystal analyzers operating at high Bragg angles, large source-to-crystal analyzer distance, or combination thereof, presence of narrow characteristic spectral lines over an extended x-ray energy range which are not useful for XAS measurement, and constraint on the maximum electron acceleration voltage to minimize high order harmonics that could be reflected by the crystal analyzer, reducing production of useful x-rays for XAS measurement.

The problems associated with crystal analyzer operating at high Bragg angles include the use of high Miller index crystal planes of the crystal analyzer with excessively narrow energy bandwidth, spectral contamination due to high order harmonics reflected by higher Miller index crystal planes of the crystal analyzer and/or low harmonics (n being a fractional integer) reflected by the lower Miller index crystal planes of the crystal analyzer, limited x-ray tuning x-ray range per crystal analyzer, and large beam size change on the sample over the x-ray energy measured. The higher and/or lower harmonics of the x-ray energy reduces the signal-to-noise ratio of XAS measurements and can lead to substantial reduction of the XAS measurement quality and throughput. The problems also impose challenges to the x-ray detector used to measure the transmitted x-rays in transmission mode XAS measurement.

Additionally, several problems can hinder accurate x-ray spectrum measurements that include 1) change of the relative position between the x-ray source, the crystal analyzer, and the detector during the measurement; 2) angular stability of the crystal analyzer; and 3) change in the x-ray spectrum of the x-ray source during the measurement.

Certain implementations described herein advantageously circumvent at least some of these problems to provide accurate x-ray spectrum measurements. Additionally, certain implementations described herein achieve higher data collection speed by collecting a large solid angle of x-rays emitted from the x-ray source.

In the 1970s and 1980s, numerous laboratory XAS systems were developed by academic groups in recognition of the capability of x-ray absorption spectroscopy for materials analysis and convenience of laboratory based XAS systems. Rigaku developed several models of commercial laboratory XAS systems but abandoned them some time ago. Most laboratory XAS systems use an electron bombardment laboratory x-ray source, a cylindrically bent crystal designed to operate in a Rowland circle geometry, and a single element (e.g., point) x-ray detector (e.g., such as ionization chamber or proportional counter). XAS spectra are typically generated by scanning the x-ray energy point by point. Energy scans are achieved by rotating the bent crystal while moving both the crystal and a detector along the Rowland circle.

Such conventional laboratory approaches suffered drawbacks that include insufficient energy resolution, poor XAS data quality, long measurement times, stringent sample preparation requirements associated with a large illuminated area, requiring use of multiple crystals for acquisition of a single spectrum, and manufacturing difficulties for standard operation (e.g., challenges associated with moving a heavy rotating anode x-ray source along the Rowland circle and/or moving the sample—which is difficult when the sample of interest is placed in in situ environments). Those drawbacks, in conjunction with increasing availability of synchrotron x-rays source based XAS facilities, led to the waning of laboratory based XAS developments.

FIG. 1 schematically illustrates two types of crystal analyzers: Johann crystal analyzers (left) and Johansson crystal analyzers (right). In earlier systems, the crystals were cylindrically bent: flat in one dimension and curved in the other like a portion of a cylinder. Johann-type and Johansson-type crystals differ in the broadening error. For a Johann-type crystal, the reflection points on the crystal away from the center lie outside of the Rowland circle (see, FIG. 1), so x-rays reflected at these non-central points by the reticular planes of the crystal are focused at different points, causing focusing aberrations (e.g., Johann errors; also referred to as focusing error) arising from the geometry. These focusing aberrations lead to degradation of the energy resolution, which is dependent on the Bragg angle $\theta_B$ and can be expressed by the following expression:

$$\varepsilon = \frac{1}{2} E \left( \frac{l}{4R} \right)^2 \cot^2 \theta_B \qquad (2)$$

where l is the crystal size (e.g., width) along the Rowland circle, and R is the Rowland circle diameter. This relation implies that the focusing aberrations increase rapidly with lower Bragg angles and consequently, high energy resolution measurements are to be performed using high Bragg angles (usually greater than 70 degrees) where the cotangent of $\theta_B$ is small. In comparison, a Johansson crystal analyzer does not suffer from the Johann focusing aberrations because the crystal is ground such that its surface matches the Rowland circle and all points of the Johansson-type crystal are coincident on the Rowland circle (see, FIG. 1).

An example laboratory XAS system, developed by a group led by Prof. Jerry Seidler at the University of Washington, is based on a conventional laboratory x-ray source with recently developed commercially available x-ray components, including a spherically bent (e.g., doubly curved, rather than the single curvature of cylindrically bent) Johann crystal analyzer and a silicon drift detector. Large Bragg angles (e.g., greater than or equal to 55 degrees) are used to achieve minimal energy broadening of the x-rays reflected by the crystal analyzer resulting from the Johann focusing error, the energy broadening $\Delta E$ given by:

$$\Delta E = E \cot \theta_B \Delta w \qquad (3)$$

where E is the x-ray energy and $\Delta w$ is the angular width of the x-ray source as seen by the crystal. The use of high Bragg angles enables high energy resolution (because source broadening from the finite source spot size and Johann errors are minimized).

Figure 2:
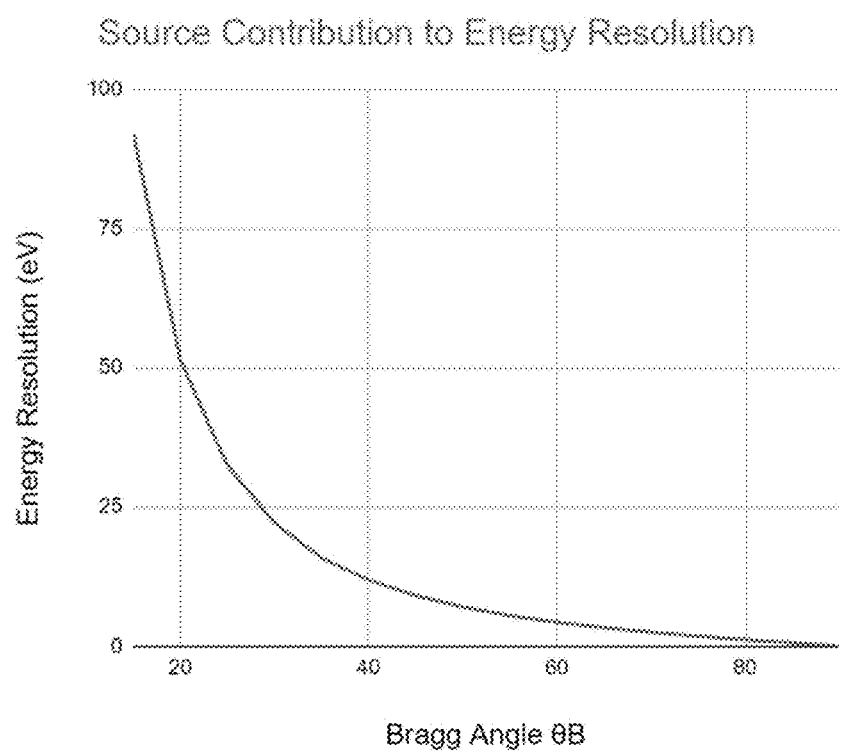
FIG. 2 is a plot of an example calculated energy broadening $\Delta E$ as a function of Bragg angle $\theta_B$ for 8 keV x-rays with an x-ray source spot size of 400 microns and a Rowland circle diameter (2R) of 500 millimeters.

FIG. 2 is a plot of an example calculated energy broadening $\Delta E$ as a function of Bragg angle $\theta_B$ for 8 keV x-rays with an x-ray source spot size of 400 microns and a Rowland circle diameter (2R) of 500 millimeters. The angular contribution ($\Delta w$) is the x-ray source spot size divided by the distance from the x-ray source to the crystal (which is equivalent to $2 \cdot R \cdot \sin \theta_B$). As shown in FIG. 2, high Bragg angles are used for large x-ray sources, with an energy resolution of 2 eV for 8 keV x-ray being achieved at angles greater than or equal to 73 degrees.

At high Bragg angles, high Miller index diffraction planes of high-quality single crystal materials (e.g., Si and Ge) are typically used, which leads to several important drawbacks. High Miller index crystal reflections have very narrow Darwin widths, which means that the energy band pass of the crystal is substantially smaller than the x-ray energy resolution desired for most XAS measurements (e.g., around 0.5 eV for XANES at about 2 keV and 1 eV to 4 eV for higher energy absorption edges of XANES). Therefore, high Miller index crystals act as an excessively narrow energy filter which leads to a large loss of useful source x-rays and thus a waste of source x-rays. Furthermore, undesirable x-rays including high order harmonics can be reflected by the crystal analyzer with higher Miller index crystal planes than lower Miller index planes, resulting lower XAS spectrum quality.

Another major drawback of using high Bragg angles is the use of multiple crystals. The energy change per degree of crystal rotation at high Bragg angles is substantially smaller than at low Bragg angles, resulting in limited energy coverage per crystal analyzer. Many crystal analyzers are therefore utilized to cover an operation energy range. For example, for a Bragg angle of 30 degrees and 8 KeV x-rays, every degree of rotation of the crystal covers about 236 eV, whereas at 85 degrees every degree of rotation of the crystal covers only about 12.4 eV. Hence, for measurements of about 100 eV coverage, the use of lower Bragg angles easily satisfies the covered range but not so at higher Bragg angles. Such a system with a wide energy coverage (e.g., 2 to 20 keV) that can address a large portion of the periodic table of elements would be cumbersome and expensive by use of an impractically large number of crystals. Additionally, the beam size on a sample also changes with x-ray energy substantially faster at higher Bragg angles than at lower Bragg angles, leading to use of a homogeneous sample (e.g., good sample uniformity) or lower XAS spectrum quality with a heterogenous sample.

A key challenge that existed in the 1970s and 1980s laboratory-based x-ray systems was the presence of harmonics that contaminate the signal. Such earlier systems simply ran the x-ray source at an electron accelerating voltage (e.g., kVp) that was less than the energy of the lowest higher order harmonic to avoid contamination of the spectra. Because the amount of bremsstrahlung x-rays produced by electron bombardment is proportional to the accelerating voltage, this reduction of accelerating voltage came at the expense of the x-ray source efficiency. To run the x-ray source at higher efficiency, Seidler's group use silicon drift detectors (SDDs) to circumvent the problem of harmonic contamination to the XAS spectrum, but new problems are introduced. First, the dimension of the active area of the SDDs is typically quite small—around 4 to 12 mm in diameter, which can be much smaller than the beam reflected by the crystal analyzer along the direction perpendicular to the Rowland circle plane and thus leads to long data collection time. Use of SDDs also limits their system design to using a spherically bent Johann crystal analyzer (SBCA) because the size of the detector utilizes point-to-point focusing. Due to Johann broadening error, their system is limited to operation at high Bragg angles. Another problem of SDDs is that the maximum count rate with acceptable linearity is less than 1,000,000 per second, limiting their use to systems with lower count rates.

Certain implementations disclosed herein provide a laboratory XAS system (e.g., apparatus) that circumvents at least some of the problems of the previous laboratory XAS systems described above and that enable laboratory XAS systems with exceptional capabilities.

In the description herein, the plane of the Rowland circle is referred to as the tangential plane, the direction along the tangential plane is referred to as the tangential direction, and the direction perpendicular to the tangential plane is referred to as the sagittal direction.

The x-ray signal, given by the number of x-ray photons per unit time per unit energy bandwidth for a given sample of a certain thickness, can be approximately described by:

$$N\left(\frac{ph}{s}\right) \alpha B * T * \Omega_D * \Omega_S * R * D * S_D * S_S * \Delta E * M \qquad (4)$$

where $S_D$ and $S_S$ are the x-ray generating spot size of the x-ray source (or the size of the detector aperture depending on the specific system design) in the tangential and sagittal directions, respectively, B is the brightness of the x-ray source (which depends on the x-ray generating spot size of the x-ray source $S_D$ and $S_S$), T is the x-ray transmission through a sample, $\Omega_D$ and $\Omega_S$ are the collection angles of the crystal analyzer in the tangential plane and the sagittal direction, respectively, R is the reflectivity of the crystal analyzer (which depends upon the Miller index of crystal reflection planes and the choice of material used), D is the detection efficiency of the detector, $\Delta E$ is the energy resolution of the system, and M is the number of (energy) spectral modes measured at the same time, which is equal to the energy range simultaneously measured divided by $\Delta E$.

The energy resolution $\Delta E$ can be selected to meet a desired energy resolution for the XAS measurements. Several factors affect the energy resolution $\Delta E$, including the geometrical broadening of the x-ray beam (which is determined by the x-ray source spot size and the distance between the x-ray source and the crystal analyzer), the Darwin width of the crystal, the penetration of the x-rays into the crystal, and the finite size of the apertures, as expressed approximately by:

$$\Delta E = E\cot(\theta)\left[\left(\frac{s_S + s_D}{4R\sin(\theta)}\right)^2 + (\omega_C)^2 + \left(\frac{2\ln 2 \cos(\theta)}{\mu 4R}\right)^2 + \left(\frac{(s_S + s_D)^4}{4(16R)^4}\sec^2(\theta)\csc^2(\theta)\right)^2\right]^{1/2} \quad (5)$$

where $\omega_c$ is the Darwin width of the crystal and $\mu$ is the linear absorption coefficient of the sample for a particular x-ray energy. For XAS measurement in the XANES region, the energy resolution $\Delta E$ can be less than the radiative line width inherent to the absorption edge due to core hole broadening. For XAS measurement in the EXAFS spectral region of energies higher than the XANES region, the energy resolution $\Delta E$ can be higher than the radiative line width and up to 10 eV.

Certain implementations described herein have an energy resolution $\Delta E$ that, for a specific XAS measurement, obtains optimal trade-off between energy resolution and measurement speed. If the energy resolution is too coarse, the finer details of the XAS spectra are not obtained. However, if the energy resolution is too fine, a significant penalty is paid in the form of throughput loss by the acquisition of spectra taking too long, rendering the system impractical. Certain implementations described herein provide a judicious choice of x-ray source spot sizes, power loading, crystal choice, and the aperture openings that optimize the tradeoff between throughput and energy resolution.

Figure 3:
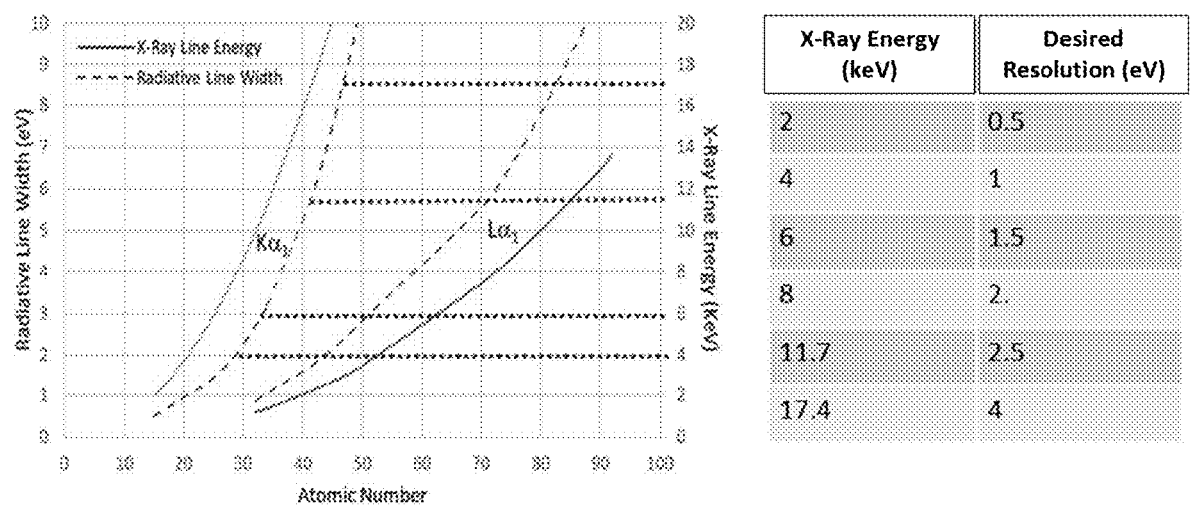
FIG. 3 is a plot of the x-ray line energy and the radiative line width as a function of atomic number of elements within a sample being analyzed.

FIG. 3 is a plot of the x-ray line energy and the radiative line width as a function of atomic number of elements within a sample being analyzed. As shown in FIG. 3, the radiative line width is typically dependent on the energy of an x-ray absorption edge. In certain implementations described herein, the XAS system is configured to have an energy resolution that matches the desired (e.g., required) energy resolution for the appropriate XAS measurements. For example, an energy resolution between 0.2× to 1× of the radiative line width can be selected for XAS measurements in the XANES spectral region based on the specific applications. A coarser energy resolution can be selected for the EXAFS region to efficiently use source x-rays to increase throughput.

Example Implementations

Figure 4:
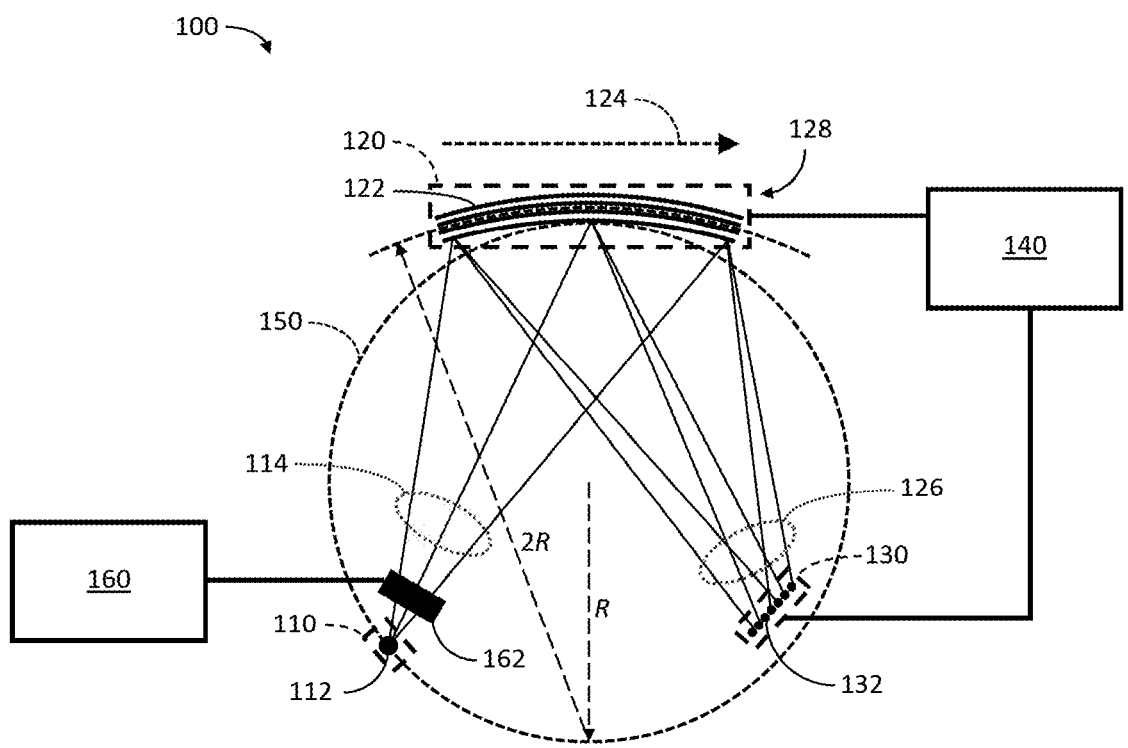
FIG. 4 schematically illustrates an example apparatus in accordance with certain implementations described herein.

FIG. 4 schematically illustrates an example apparatus 100 in accordance with certain implementations described herein. The apparatus 100 comprises an x-ray source 110 comprising a target 112 configured to generate x-rays 114 upon bombardment by electrons. The apparatus 100 further comprises a crystal analyzer 120 positioned relative to the x-ray source 110 on a Rowland circle 150 in a tangential plane and having a Rowland circle radius (R). The crystal analyzer 120 comprises crystal atomic planes 122 curved along at least one direction 124 with a radius of curvature substantially equal to twice the Rowland circle radius (2R). The crystal atomic planes 122 are configured to receive x-rays 114 from the x-ray source 110 and to disperse the received x-rays according to Bragg's law (e.g., the dispersed x-rays 126). The apparatus 100 further comprises a spatially resolving detector 130 positioned at a distance (D) from a downstream side 128 of the crystal analyzer 120, with D less than or equal to 2R. The spatially resolving detector 130 is configured to receive at least a portion of the dispersed x-rays 126, the spatially resolving detector 130 comprising a plurality of x-ray detection elements 132 having a tunable first x-ray energy and/or a tunable second x-ray energy. The plurality of x-ray detection elements 132 are configured to measure received dispersed x-rays 126 having x-ray energies below the first x-ray energy while suppressing measurements of the received dispersed x-rays 126 above the first x-ray energy and/or to measure the received dispersed x-rays 126 having x-ray energies above the second x-ray energy while suppressing measurements of the received dispersed x-rays 126 below the second x-ray energy. The first and second x-ray energies are tunable in a range of 1.5 keV to 30 keV.

In certain implementations, the Rowland circle 150 is a circle tangent to a center of the surface of the crystal analyzer 120 impinged by the x-rays 114. The Rowland circle radius (R) in certain implementations is in a range of less than 100 millimeters, in a range of 100 millimeters to 200 millimeters, in a range of 200 millimeters to 300 millimeters, in a range of 300 millimeters to 500 millimeters, or in a range of 500 millimeters to 1000 millimeters.

In certain implementations, the apparatus 100 further comprises at least one stage 140 configured to position the crystal analyzer 120 with respect to the x-ray source 110 on the Rowland circle 150 in the tangential plane with the curved direction 124 of the crystal atomic planes 122 aligned to the tangential plane, and to position the spatially resolving detector 130 at the distance (D) from the downstream side 128 of the crystal analyzer 120. For example, the at least one stage 140 can comprise at least one linear motion stage configured to adjust the position of the crystal analyzer 120 (e.g., along substantially perpendicular x-, y-, and z-directions) and at least one rotational motion stage configured to adjust the orientation of the crystal analyzer 120 (e.g., in substantially perpendicular pitch, yaw, roll angles about principal axes). For another example, the at least one stage 140 can comprise at least one linear motion stage configured to adjust the position of the spatially resolving detector 130 (e.g., along substantially perpendicular x-, y-, and z-directions) and at least one rotational motion stage configured to adjust the orientation of the spatially resolving detector 130 (e.g., in substantially perpendicular pitch, yaw, roll angles about principal axes).

In certain implementations, the apparatus 100 further comprises a sample stage 160 configured to position a sample 162 for analysis either between the x-ray source 110 and the crystal analyzer 120 or between the crystal analyzer 120 and the spatially resolving detector 130. For example, the sample stage 140 can comprise at least one linear motion sub-stage configured to adjust the position of the sample 162 (e.g., along substantially perpendicular x-, y-, and z-directions) and at least one rotational motion sub-stage configured to adjust the orientation of the sample 162 (e.g., in substantially perpendicular pitch, yaw, roll angles about principal axes).

In certain implementations, the crystal analyzer 120 is configured to be operated at low Bragg angles (e.g., in the range of 10 degrees to 60 degrees; in the range of 10 degrees to 40 degrees; in the range of 10 degrees to 30 degrees). For example, the curved crystal atomic planes 122 can comprise crystal atomic planes (e.g., atomic planes of a single crystal material selected from the group consisting of: silicon, germanium, and quartz) having low Miller indices (e.g., Si<111>; Si<220>; Ge<111>; Ge<400>) and that are bent (e.g., mechanically deformed to be curved) along the at least one direction 124 to have a radius of curvature (2R) in a range of 100 millimeters to 2000 millimeters. In certain implementations, the curved, low Miller index crystal atomic planes 122 at low Bragg angles can advantageously relax the sample uniformity constraints because at low Bragg angles, the change in the x-ray beam size on the sample 162 that contributes to the analysis is small as the crystal analyzer 120 is rotated.

In certain implementations, by using such curved, low Miller index crystal atomic planes 122, the crystal analyzer 120 can have an energy resolution that is optimized according to a predetermined spectral region of an x-ray absorption spectroscopy (XAS) measurement to be made. For example, the energy resolution can be selected to be from 0.2 to 1 times a radiative line width of an element to be measured (see, e.g., FIG. 3), the radiative line width due to core hole broadening for the pre-edge spectral region before the peak absorption edge energy and the X-ray Absorption Near-Edge Structure (XANES) region, and can be selected to be from 1 to 5 times of the radiative line width for the EXAFS region. Such energy optimization of the crystal analyzer 120 can enable efficient use of source x-rays 114 and fast data acquisition speeds.

In certain implementations, the curved, low Miller index crystal atomic planes 122 provide a large energy change per degree of rotation of the crystal analyzer 120, thereby enabling the crystal analyzer 120 to cover a large energy range over a given rotation angular range for XAS measurements. In certain such implementations, a small number of crystal analyzers 120 can be used for XAS measurements over a large energy range. For example, just two crystal analyzers 120, one with Ge<111> crystal atomic planes 122 and the other with Ge<200> crystal atomic planes, operating with Bragg angles in a range of 10 degrees to 50 degrees, can be sufficient for XAS measurements over an energy range of 4 keV to 20 keV.

In certain implementations, the source x-ray collection angle (e.g., efficiency) in the tangential plane (e.g., dispersion plane) for the curved crystal atomic planes 122 can be larger than for flat crystal atomic planes, thereby producing a converging (e.g., focused) x-ray beam at the Rowland circle 150 in the tangential plane. For example, with an x-ray beam 126 focused on the Rowland circle 150, a single element detector can be used. In certain implementations, a slit aperture can be used on the Rowland circle 150 and at the upstream side of the detector 130 to improve energy resolution. For example, for sizes of the crystal analyzer 120 of the order of 50 millimeters to 100 millimeters can result in a collection angle of about 0.1 radian to 0.3 radian of a narrow energy bandwidth in the tangential plane, which can be over two orders of magnitude higher than with flat crystals for which the acceptance angle is determined by the Darwin width (e.g., in the range of 10 microradians to 50 microradians). In certain implementations, the crystal atomic planes 122 can also be curved (e.g., bent) in the sagittal direction, thereby increasing the collection angle of the x-rays 126 in the sagittal direction as well.

In certain implementations, the apparatus 100 comprises a cylindrically curved (e.g., bent) Johansson crystal analyzer 120, which can provide a large x-ray collection angle in the tangential direction but a limited x-ray collection angle in the sagittal direction for a given x-ray energy. In certain other implementations, the apparatus 100 comprises a spherically curved (e.g., bent) Johansson crystal analyzer, a spherically curved (e.g., bent) Johann crystal analyzer, a cylindrically curved (e.g., bent) Johann crystal analyzer, or an analyzer with Wittry geometry.

Figure 5:
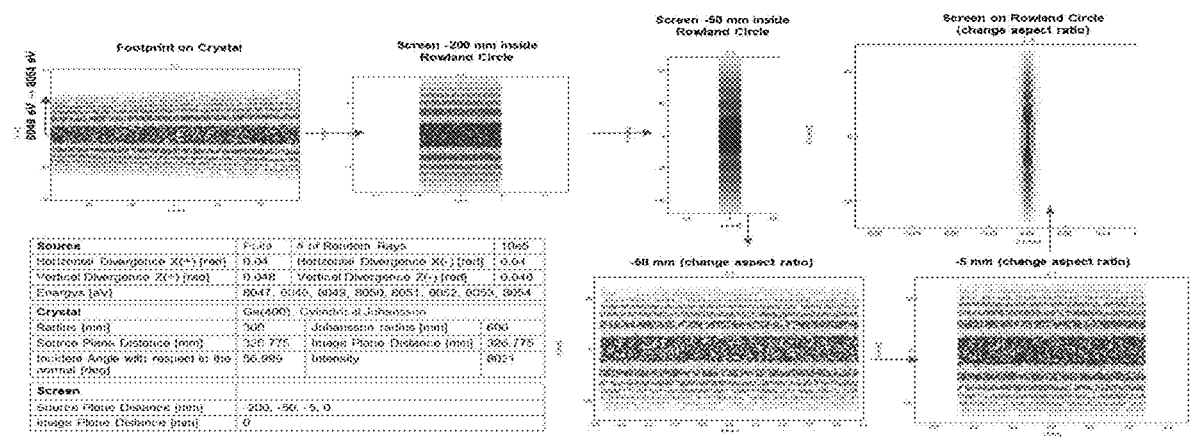
FIG. 5 schematically illustrates simulation ray tracings of dispersed x-rays downstream from an example cylindrically curved Johansson crystal analyzer in accordance with certain implementations described herein.

FIG. 5 schematically illustrates simulation ray tracings of dispersed x-rays 126 downstream from an example cylindrically curved Johansson crystal analyzer 120 in accordance with certain implementations described herein. The example cylindrically curved Johansson crystal analyzer 120 of FIG. 5 has a Rowland circle radius R equal to 300 millimeters and a crystal plane bending radius 2R equal to 600 millimeters, and the x-ray source 110 was simulated as a point source emitting x-rays 114 within an angle of ±40 milliradians in the tangential direction and ±48 milliradians in the sagittal direction, and a set of x-ray energies in a range of 8047 eV to 8054 eV, with each band in FIG. 5 corresponding to a 1 eV energy band. The horizontal axis is the distance in the tangential direction parallel to the Rowland circle 150 and the vertical axis is the distance in the sagittal direction. In the leftmost plot, each of the bands corresponds to the surface area of the crystal analyzer 120 that reflects x-rays of one energy. The central band corresponds to x-rays having energies of 8048 eV and the remaining bands correspond to x-rays with energies higher than 8048 eV. Each pairs of bands counted from the center stripe corresponds to an increase of x-ray energy by 1 eV. The other plots of FIG. 5 show example x-ray spectral distributions of the dispersed x-rays 126 at various locations relative to the Rowland circle 150 (e.g., 200 millimeters inside the Rowland circle 150, 50 millimeters inside the Rowland circle 150, 5 millimeters inside the Rowland circle 150, and on the Rowland circle 150).

As seen in FIG. 5, the example cylindrically curved Johansson crystal analyzer 120 can disperse a wide energy range in the sagittal direction with high energy x-ray dispersion. The dispersed x-rays 126 can be measured by the detector 130 with at least some detection elements 132 positioned along the sagittal direction to differentiate the angularly dispersed x-rays 126 along the sagittal direction (e.g., a detector 130 with multiple detector elements 132 along the sagittal direction with sufficient spatial resolution can resolve the spectrum). In this way, the apparatus 100 can measure a spectrum over a finite x-ray energy range with sufficiently high energy resolution. Furthermore, the spatial resolution for measuring the spectrum can be significantly relaxed when the detector 130 is positioned close to the crystal analyzer 120 (e.g., within the Rowland circle 150).

In certain implementations in which some or all of the detection elements 132 have at least one energy threshold (e.g., the tunable first and second x-ray energies) to define an XAS energy bandwidth of interest (e.g., 50 eV to 5 keV), the signal-to-noise ratio of the XAS spectrum can be improved by suppressing measurement of (e.g., rejecting) x-rays 126 either above the XAS energy bandwidth of interest, thereby suppressing (e.g., rejecting) one or more harmonics diffracted by the crystal analyzer 120 and/or by rejecting x-rays 126 with x-ray energies below the XAS energy bandwidth of interest by suppressing (e.g., rejecting) fluorescence x-rays.

In certain implementations, the apparatus 100 comprises a spherically curved (e.g., bent) Johansson crystal analyzer 120, which can provide a large x-ray collection angle in the tangential direction and higher x-ray collection angle in the sagittal direction for a given x-ray energy resolution than can the cylindrically curved Johansson crystal analyzer 120. The spherically curved Johansson crystal analyzer 120 can disperse an x-ray energy range in both the tangential direction and the sagittal direction and the dispersed x-rays 126 can be measured with a detector 130 with a plurality of detection elements 132 configured to measure the angularly dispersed x-rays 126 along the tangential direction, achieving a spectrum over a finite x-ray energy range with high energy resolution.

Figure 6:
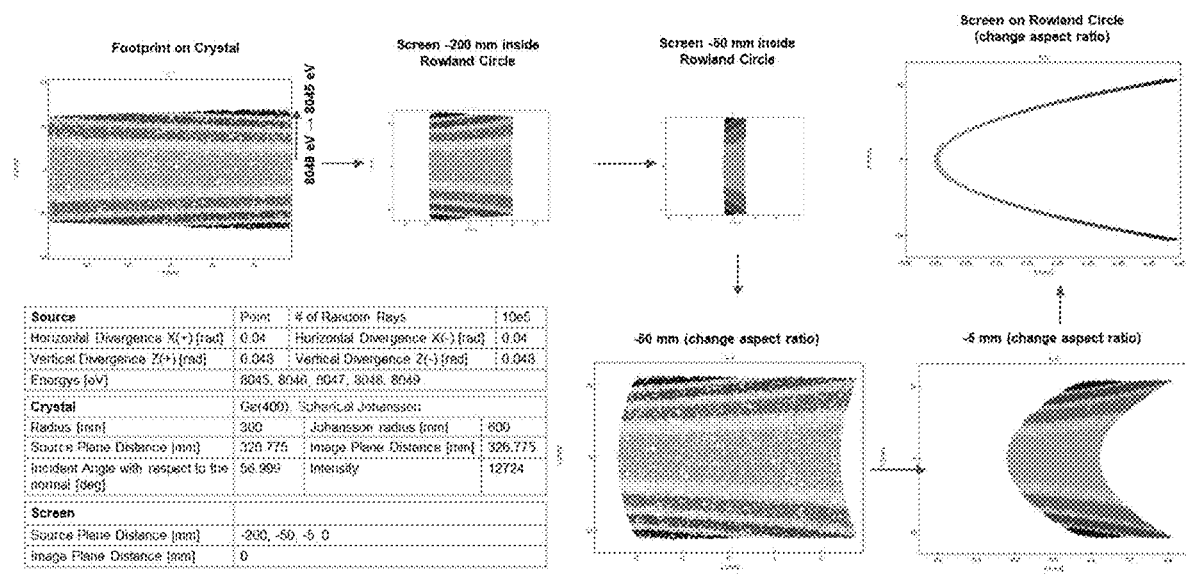
FIG. 6 schematically illustrates simulation ray tracings of dispersed x-rays downstream from an example spherically curved Johansson crystal analyzer in accordance with certain implementations described herein.

FIG. 6 schematically illustrates simulation ray tracings of dispersed x-rays 126 downstream from an example spherically curved Johansson crystal analyzer 120 in accordance with certain implementations described herein. The example spherically curved Johansson crystal analyzer 120 of FIG. 6 has a Rowland circle radius R equal to 300 millimeters and a crystal plane bending radius 2R equal to 600 millimeters, and the x-ray source 110 was simulated as a point source emitting x-rays 114 within an angle of ±40 milliradians in the tangential direction and ±48 milliradians in the sagittal direction, and a set of x-ray energies in a range of 8045 eV to 8049 eV, with each band in FIG. 6 corresponding to a 1 eV energy band. The horizontal axis is the distance in the tangential direction parallel to the Rowland circle 150 and the vertical axis is the distance in the sagittal direction. In the leftmost plot, each of the bands corresponds to the surface area of the crystal analyzer 120 that reflects x-rays of one energy. The central band corresponds to x-rays having energies of 8048 eV and the remaining bands correspond to x-rays with energies less than 8048 eV. Each pairs of bands counted from the center stripe corresponds to decrease of x-ray energy by 1 eV. The other plots of FIG. 6 show example x-ray spectral distributions of the dispersed x-rays 126 at various locations relative to the Rowland circle 150 (e.g., 200 millimeters inside the Rowland circle 150, 50 millimeters inside the Rowland circle 150, 5 millimeters inside the Rowland circle 150, and on the Rowland circle 150).

As seen in FIG. 6, the dispersed x-rays 126 can be measured by the detector 130 with at least some detection elements 132 positioned along the sagittal direction to differentiate the angularly dispersed x-rays 126 along the sagittal direction (e.g., a detector 130 with multiple detector elements 132 along the sagittal direction with sufficient spatial resolution can resolve the spectrum). In this way, the apparatus 100 can measure a spectrum over a finite x-ray energy range with sufficiently high energy resolution. Furthermore, the spatial resolution for measuring the spectrum can be significantly relaxed when the detector 130 is positioned close to the crystal analyzer 120 (e.g., within the Rowland circle 150).

In certain implementations, the apparatus 100 comprises a spherically curved (e.g., bent) Johann crystal analyzer 120, which can provide a large x-ray collection angle in the sagittal direction but limited x-ray collection angle in the tangential direction for a given x-ray energy resolution. The spherically curved Johann crystal analyzer 120 can disperse an x-ray energy range in the tangential direction and the dispersed x-rays 126 can be measured with a detector 130 with a plurality of detection elements 132 configured to measure the angularly dispersed x-rays 126 along the tangential direction, achieving a spectrum over a finite x-ray energy range with high energy resolution.

Figure 7:
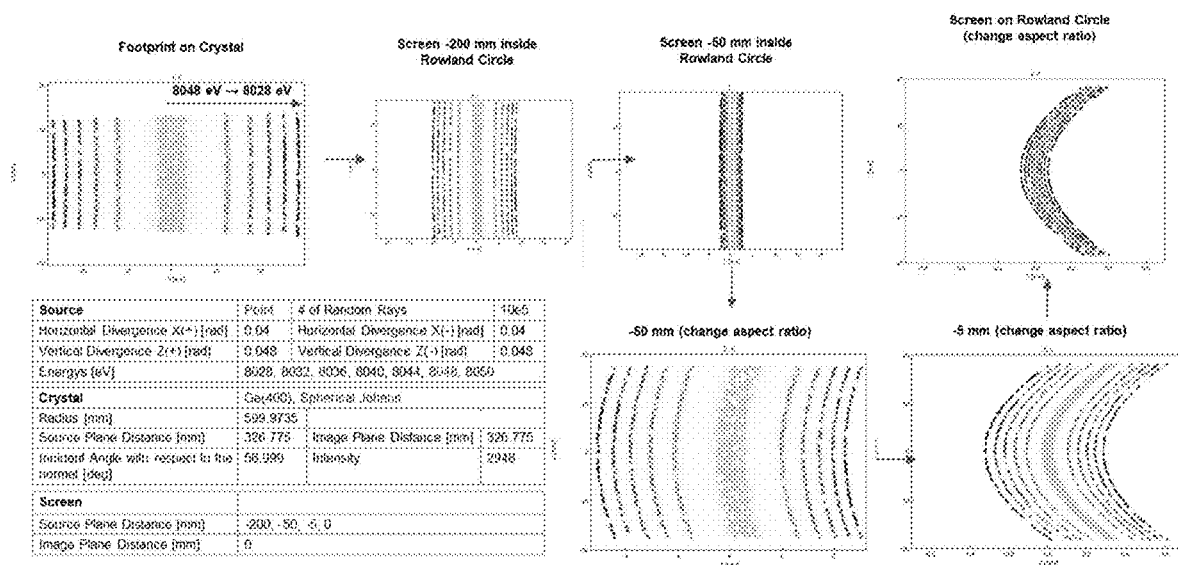
FIG. 7 schematically illustrates simulation ray tracings of dispersed x-rays downstream from an example spherically curved Johann crystal analyzer in accordance with certain implementations described herein.

FIG. 7 schematically illustrates simulation ray tracings of dispersed x-rays 126 downstream from an example spherically curved Johann crystal analyzer 120 in accordance with certain implementations described herein. The example spherically curved Johann crystal analyzer 120 of FIG. 7 has a Rowland circle radius R equal to 300 millimeters and a crystal plane bending radius 2R equal to 600 millimeters, and the x-ray source 110 was simulated as a point source emitting x-rays 114 within an angle of ±40 milliradians in the tangential direction and ±48 milliradians in the sagittal direction, and a set of x-ray energies in a range of 8028 eV to 8048 eV, with each band in FIG. 7 corresponding to a 4 eV energy band. The horizontal axis is the distance in the tangential direction parallel to the Rowland circle 150 and the vertical axis is the distance in the sagittal direction. In the leftmost plot, each of the bands corresponds to the surface area of the crystal analyzer 120 that reflects x-rays of one energy. The central band corresponds to x-rays having energies of 8048 eV and the remaining bands correspond to x-rays with energies less than 8048 eV. Each pairs of bands counted from the center stripe corresponds to decrease of x-ray energy by 4 eV. The other plots of FIG. 7 show example x-ray spectral distributions of the dispersed x-rays 126 at various locations relative to the Rowland circle 150 (e.g., 200 millimeters inside the Rowland circle 150, 50 millimeters inside the Rowland circle 150, 5 millimeters inside the Rowland circle 150, and on the Rowland circle 150).

As seen in FIG. 7, the dispersed x-rays 126 can be measured by the detector 130 with at least some detection elements 132 positioned along the sagittal direction to differentiate the angularly dispersed x-rays 126 along the sagittal direction (e.g., a detector 130 with multiple detector elements 132 along the sagittal direction with sufficient spatial resolution can resolve the spectrum). In this way, the apparatus 100 can measure a spectrum over a finite x-ray energy range with sufficiently high energy resolution. Furthermore, the spatial resolution for measuring the spectrum can be significantly relaxed when the detector 130 is positioned close to the crystal analyzer 120 (e.g., within the Rowland circle 150).

In certain implementations, the apparatus 100 comprises a toroidally curved (e.g., bent) Johansson crystal analyzer 120, which like the spherically curved Johansson crystal analyzer 120, can provide a large x-ray collection angle in the tangential direction but higher x-ray collection angle than the cylindrically curved Johansson crystal analyzer 120 in the sagittal direction for a given x-ray energy resolution. The toroidally curved Johansson crystal analyzer 120 can disperse the x-rays in both the tangential direction and the sagittal direction, and the dispersed x-rays 126 can be measured with a detector 130 with a plurality of detection elements 132 configured to measure the angularly dispersed x-rays 126 along the tangential direction, achieving a spectrum over a finite x-ray energy range with high energy resolution.

In certain implementations, the x-ray source 110 comprises a high efficiency (e.g., high brightness) x-ray source comprising an electron source and at least one anode target 112 (e.g., having a size on the order of microns) configured to generate x-rays upon being bombarded by electrons from the electron source. The target 112 can be on or embedded in a thermally conductive substrate (e.g., comprising diamond) configured to dissipate thermal energy from the target 112 that is generated by the electron bombardment of the target 112. Examples of target 112 materials include but are not limited to, Cu, Cr, Fe, Co, Ni, Zn, Al, Rh, Mo, Pd, Ag, Ta, Au, W, SiC, MgCl, or other metals or metal-containing materials. Examples of x-ray sources 110 compatible with certain implementations described herein are disclosed by U.S. Pat. Nos. 10,658,145, 9,874,531, 9,823,203, 9,719,947, 9,594,036, 9,570,265, 9,543,109, 9,449,781, 9,448,190, and 9,390,881, each of which is incorporated in its entirety by reference herein.

Figure 8:
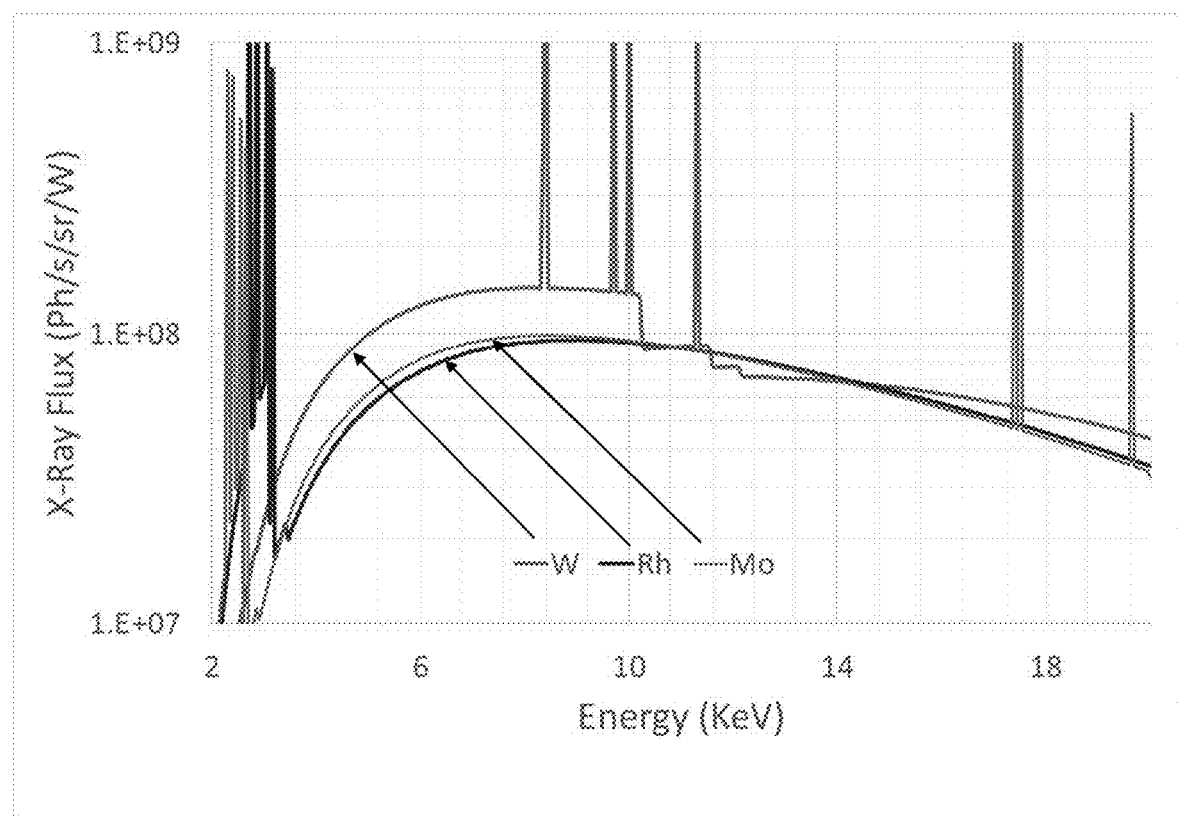
FIG. 8 shows simulated x-ray spectra from a tungsten (W) target, a rhodium (Rh) target, and a molybdenum (Mo) target.

In certain implementations, the x-ray source 110 can comprise a plurality of targets 112 having different materials configured to provide a continuous (e.g., smooth) x-ray energy spectrum over an extended x-ray energy range for XAS measurements. Certain such implementations can overcome a limitation of single target material x-ray sources 110 in which the spectrum of the resultant x-rays 114 from a single target 112 includes characteristic lines over an extended energy range, and these characteristic lines are not suitable for XAS measurements. For example, FIG. 8 shows simulated x-ray spectra from a tungsten (W) target 112, a rhodium (Rh) target 112, and a molybdenum (Mo) target 112. The presence of the characteristic lines of the W target 112 between 7.5 keV and 13 keV makes this spectral region from the W target 112 unsuitable for XAS measurements. In certain implementations, an x-ray source 110 comprising a W target 112 and one or both of a Rh target 112 and a Mo target 112 can provide a combined continuous (e.g., smooth) energy spectrum over a range of 1.5 keV to 20 keV by using the W target 112 for the ranges of 1.5 keV to 7.5 keV and 13 keV to 20 keV and using the Rh target 112 and/or the Mo target 112 for the range of 7.5 keV to 14 keV. While W is more efficient for x-ray production, which is proportional to the atomic number Z of the target material and the electron accelerating voltage, the characteristic lines in the x-ray spectrum from the W target 112 can contaminate the spectrum between 7.5 keV and 14 keV, so the Rh and/or Mo targets 112 can be used instead for this energy range.

In certain implementations, the size and shape of the target 112 are selected to optimize performance depending on the parameters and characteristics of the crystal analyzer 120. For example, for a cylindrically curved Johansson crystal analyzer 120, the x-ray source 110 can comprise a rectangular (e.g., line-shaped) target 112 having a first dimension (e.g., width; in a range of 3 microns to 100 microns) that is substantially aligned along the tangential direction and a second dimension (e.g., length; in a range of 10 microns to 4 millimeters) that is substantially aligned along the sagittal direction. The ratio of the second dimension to the first dimension for obtaining a given fractional energy resolution $\Delta E/E$ due to the size of the target 112 can be approximately equal to $(\Delta E/E)^{1/2} \cdot \cot(\theta)$, where $\theta$ is the Bragg angle. For another example, for a spherically curved Johann crystal analyzer 120 or for a spherically curved Johansson crystal analyzer 120, the ratio of the second dimension to the first dimension for obtaining an given fractional energy resolution $\Delta E/E$ due to the size of the target 112 can be approximately equal to $(\Delta E/E)^{-1/2} \cdot \cot(\theta) \cdot \sin(G)$. The x-ray source spot size (e.g., the size of the electron beam spot bombarding the target 112) is the "apparent" source size when viewed at the take-off angle such that the electron footprint on the target 112 is compressed along one axis (e.g., the apparent source spot size is one-tenth the size of the electron footprint at a take-off angle of 6 degrees).

Figure 9:
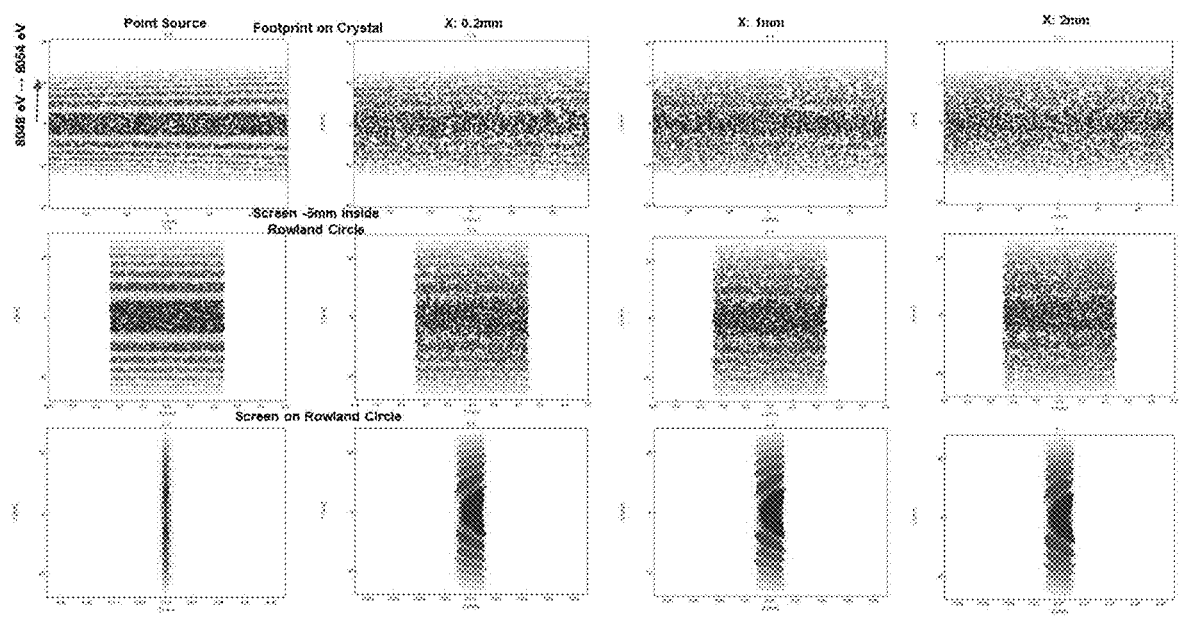
FIG. 9 schematically illustrates simulation ray tracings of dispersed x-rays downstream from an example cylindrically curved Johansson crystal analyzer for various targets in accordance with certain implementations described herein.

FIG. 9 schematically illustrates simulation ray tracings of dispersed x-rays 126 downstream from an example cylindrically curved Johansson crystal analyzer 120 for various targets 112 in accordance with certain implementations described herein. The example cylindrically curved Johansson crystal analyzer 120 of FIG. 9 has a Rowland circle radius R equal to 300 millimeters and a crystal plane bending radius 2R equal to 600 millimeters, and the x-ray source 110 was simulated as emitting x-rays 114 within an angle of ±40 milliradians in the tangential direction and ±48 milliradians in the sagittal direction, and a set of x-ray energies in a range of 8048 eV to 8054 eV, with each band in FIG. 9 corresponding to a 1 eV energy band. For the targets 112 of FIG. 9, the first dimension substantially along the tangential direction is 20 microns and one-half of the second dimension along the sagittal direction is varied among 0 (e.g., point source), 0.2 millimeter, 1 millimeter, and 2 millimeters. The horizontal axis is the distance in the tangential direction parallel to the Rowland circle 150 and the vertical axis is the distance in the sagittal direction. In the topmost plot for the point source, each of the bands corresponds to the surface area of the crystal analyzer 120 that reflects x-rays of one energy. The central band corresponds to x-rays having energies of 8048 eV and the remaining bands correspond to x-rays with energies higher than 8048 eV. Each pairs of bands counted from the center stripe corresponds to an increase of x-ray energy by 1 eV. The other topmost plots for the other sizes of the x-ray source spot size of the target 112, the bands are less well-defined but are distinguishable even with the largest simulated x-ray source spot size, indicating that energy resolution of about 1 eV can still be achieved. The other plots in FIG. 9 show the x-ray spectral distribution at two different locations relative to the Rowland circle 150 (e.g., 5 millimeters inside the Rowland circle 150 and on the Rowland circle 150).

As seen in FIG. 9, the second dimension of the target 112 substantially aligned with the sagittal direction can be much greater than the first dimension of the target 112 substantially aligned with the tangential direction for the cylindrically curved Johansson crystal analyzer 120. The dispersed x-rays 126 can be measured by the detector 130 with at least some detection elements 132 positioned along the sagittal direction to differentiate the angularly dispersed x-rays 126 along the sagittal direction (e.g., a detector 130 with multiple detector elements 132 along the sagittal direction with sufficient spatial resolution can resolve the spectrum). FIG. 9 shows that the x-ray source spot size of the target 112 along the sagittal direction can be increased to increase the x-ray source power and to increase throughput while keeping the energy resolution to a desired value (e.g., 1 eV). For example, a high resolution, two-dimensional detector 130 positioned at the Rowland circle 150 can be used as the energy bands are more clearly separated. For a detector 130 with a high spatial resolution, an x-ray source 110 with an extended spot size and high power can be used.

In certain implementations, the x-ray source 110 can comprise at least one grazing incidence mirror configured to substantially reflect the x-rays 114 from the target 112 in the sagittal plane. For example, the target 114 can emit a beam of x-rays 114 that has an angular range that is larger than the acceptance of the crystal analyzer 120. A pair of grazing incidence plane mirrors can be placed (e.g., one at each side of the x-ray beam) to reflect portions of the x-ray beam that would miss the crystal analyzer 120. The at least one grazing incidence mirror can be considered as at least one virtual source of x-rays positioned close to the Rowland circle 150 and that can be used to monitor the background simultaneously with the central spectrum acquisition.

In certain implementations, the spatially resolving detector 130 is selected from the group consisting of: a pixel array photon counting detector, a direct conversion charge coupled device (CCD) detector (e.g., configured to operate in single photon detection mode), a complementary metal-oxide-semiconductor (CMOS) detector (e.g., configured to operate in single photon detection mode), and a plurality of silicon drift detectors (e.g., placed in close proximity to one another or integrated with one another). For example, the spatially resolving detector 130 can comprise a one-dimensional (1D) position sensitive detector (e.g., strip detector) or a two-dimensional (2D) position sensitive detector. In certain implementations, a two-dimensional (2D) spatially resolving detector 130 having sufficient spatial resolution can be used with a large x-ray source spot size to achieve sufficiently high energy resolution. While FIG. 4 schematically illustrates an example implementation in which the spatially resolving detector 130 is at least partially inside the Rowland circle 150, in certain other implementations, the spatially resolving detector 130 is at least partially on the Rowland circle 150 or at least partially outside the Rowland circle 150.

In certain implementations, the detection elements 132 (e.g., pixels; complete detectors) of the spatially resolving detector 130 have spatial dimensions in at least one dimension configured to provide a predetermined energy resolution (e.g., in a range of 0.2 eV to 3 eV) and a predetermined energy range (e.g., in a range of 3 eV to 200 eV). For example, the detection elements 132 can each have a size along the tangential direction in a range of 3 microns to 200 microns and a size along the sagittal direction in a range of 3 microns to 5000 microns. In certain implementations, the detection elements 132 are spatially separated from one another such that each detection element 132 corresponds to less than 3 eV (e.g., in a range of 0.5 eV to 3 eV) of the beam spread of the dispersed x-rays 126 at the detector 130 (e.g., for XANES measurements) or can correspond to less than 10 eV (e.g., in a range of 1 eV to 10 eV) of the beam spread of the dispersed x-rays 126 at the detector 130 (e.g., for EXAFS measurements). For example, to achieve high throughput, the apparatus 100 is configured to utilize an x-ray spectrum that has a breadth covered by the detector 130 while simultaneously having a number M of spectral modes (e.g., energy bands) measured at the same time by the detector 130, where M is given by the spectral coverage at the detector 130 divided by the energy bandwidth per detection element 132. For example, for a spectral coverage of 200 eV at the detector 130 and an energy bandwidth of 2 eV per detection element 132, M is equal to 100. In certain implementations, the detection elements 132 have a linearity at a count rate exceeding $10^6$ photons per second (most silicon drift detectors are linear only to 0.5 million photons per second).

In certain implementations, the spatially resolving detector 130 is configured to measure the distribution of the dispersed x-rays 126 from the crystal analyzer 120. For example, for a cylindrically curved Johansson crystal analyzer 120, the detection elements 132 can be configured to measure angularly dispersed x-rays 126 along the sagittal direction. For another example, for a spherically curved Johann crystal analyzer 120, the detection elements 132 can be configured to measure angularly dispersed x-rays 126 along the tangential direction. For another example, for a spherically curved Johann crystal analyzer 120, at least some of the detection elements 132 can be configured to measure angularly dispersed x-rays 126 along the tangential direction. In this example, the size of each detector element 132 can be small, with the detection element size in the tangential direction (DI) expressed by: $2 \cdot R \cdot \sin(\theta) \cdot \Delta E/E \geq \cot(\theta) \cdot D1$ and the size along the sagittal direction (S2) of the x-ray source spot on the target 112 expressed by: $2 \cdot R \cdot \sin(\theta) \cdot (\Delta E/E)^{1/2} \geq S2$, where R is the Rowland circle radius and $\theta$ is the Bragg angle. In certain implementations, the center of the detector 130 is positioned on the Rowland circle 150. The size along the sagittal direction (D2) of the detection elements 132 can be smaller than S2.

In certain implementations, the detection elements 132 have at least one tunable energy threshold (e.g., selected by the user of the apparatus 100 or automatically by a computer-based controller) to suppress (e.g., reject) x-rays outside the energy range of interest and that degrade the XAS measurements. For example, higher order harmonics can generate a background signal contribution of 10% in the measured spectrum, which can reduce the throughput by about 3x. In certain implementations, the detection elements 132 are configured to measure x-rays 126 having x-ray energies below a tunable first x-ray energy while suppressing measurements of x-rays 126 above the tunable first x-ray energy. In this way, the detection elements 132 can suppress (e.g., reject) higher order harmonics diffracted by the crystal analyzer 120, thereby improving the quality of the measured XAS spectrum. Another benefit of suppressing measurements of higher energy x-rays is that the x-ray source 110 can be operated at higher accelerating voltages for higher x-ray flux and throughput. For another example, low energy x-rays (e.g., reflected x-rays from the crystal analyzer 120; fluorescence x-rays from the sample 162) that satisfy Bragg's law can be received by the detector 130 and can contribute to the background signal. In certain implementations, the detection elements 132 are configured to measure x-rays 126 having x-ray energies above a tunable second x-ray energy while suppressing measurements of x-rays 126 below the tunable second x-ray energy. In this way, the detection elements 132 can suppress (e.g., reject) the low energy x-rays contributing to the background signal and to provide high quality XAS spectra. In certain implementations, the detection elements 132 have both a tunable first x-ray energy and a tunable second x-ray energy.

In certain implementations, the detector 130 comprises an aperture between the crystal analyzer 120 and the detection elements 132. For example, the aperture can be configured to have an adjustable size (e.g., by a user of the apparatus 100; by a computer-based controller) to controllably adjust an energy resolution of the detector 130. For another example, the aperture can be structured (e.g., have a pattern of openings) such that the shape of the x-rays 126 received by the detector 130 ensure centering of components on the Rowland circle 150. In certain implementations, in which the detection elements 132 have large dimensions and the size in the tangential direction of the x-ray source spot on the target 112 is large, a small aperture in front of the detection elements 132 can be used to achieve small detector dimensions.

In certain implementations, the apparatus 100 is used to measure transmission mode XAS spectra in an improved manner as compared to conventional XAS systems. For example, using a conventional XAS system, a complete transmission mode XAS measurement can be performed by scanning the angle of the crystal analyzer over an angular range to cover the x-ray energy range desired for the XAS measurement (e.g., 50-100 eV for XANES measurements; 300-1000 eV for EXAFS measurements). In contrast, in accordance with certain implementations described herein, XAS measurements can be made by simultaneously collecting multiple narrow spectra (e.g., finite energy ranges each narrower than the desired energy range for the XAS measurement) with energy ranges that partially overlap with one another. These multiple spectra can be normalized and combined together appropriately to form the full XAS measurement. In certain implementations, collecting the multiple spectra with overlapping energy range can be used to minimize x-ray source intensity fluctuation between two spectra collected with overlapping energy range.

For another example, the apparatus 100 can be used to provide EXAFS spectra with higher resolution than conventional EXAFS systems. In accordance with certain implementations described herein, an XAS spectrum can be collected in the pre-edge region and in the XANES spectral region with energy resolution equal to or better than the radiative line width (e.g., by selecting the material of the crystal analyzer 120 and the Miller indices of the crystal atomic planes 112 for higher energy resolution) and in the full EXAFS spectral region (e.g., in the spectral region away from the absorption edge) with coarser energy resolution (e.g., 3-10 eV) but higher x-ray flux. The spectral region of the full EXAFS by the spectrum can be replaced by the pre-edge and XANES regions, with appropriate intensity normalization and stitching to generate a spectrum.

Figure 10:
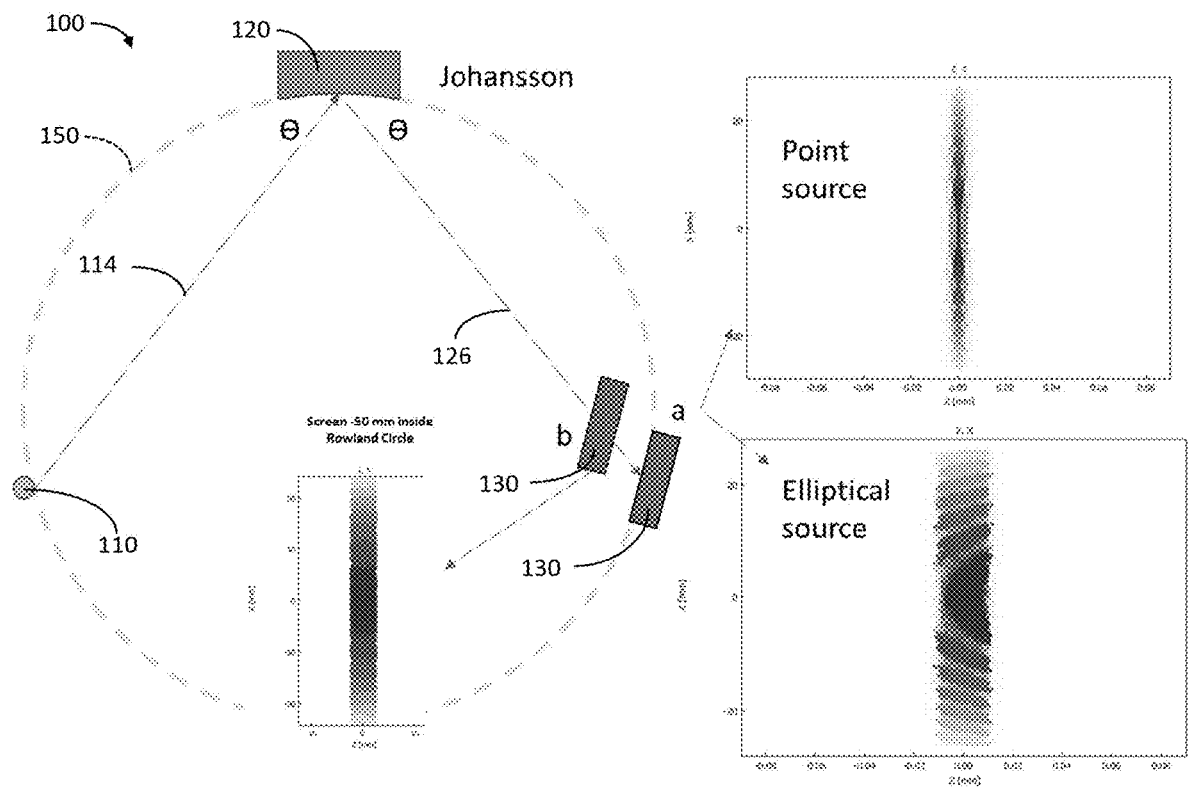
FIG. 10 schematically illustrates an example apparatus configured for XAS measurements in accordance with certain implementations described herein.

FIG. 10 schematically illustrates an example apparatus 100 configured for XAS measurements in accordance with certain implementations described herein. In certain such implementations, the apparatus 100 comprises an x-ray source 110 comprising a target 112 having a small x-ray source spot size in the tangential direction, a cylindrically curved Johansson crystal analyzer 120, and a spatially resolving detector 130 with a plurality of detection elements 132 that are spatially resolving in at least one of the tangential direction and the sagittal direction. The target 112 of the x-ray source 110 can have a linear shape (e.g., a size along the tangential direction in a range of 3 microns to 50 microns and a size along the sagittal direction in a range of 20 microns to 4000 microns), and the x-ray source 110 can comprise multiple target materials. The cylindrically curved Johansson crystal analyzer 120 can comprise a single crystal of Si, Ge, or quartz, can be used at low Bragg angles (e.g., in a range of 15 degrees to 40 degrees), can have a Rowland circle radius R in a range of 50 millimeters to 1000 millimeters, and can have a crystal size less than or equal to 100 millimeters in both the tangential direction and the sagittal direction. The spatially resolving detector 130 can be one-dimensional (1D) or two-dimensional (2D) and comprising at least some detection elements 132 along the sagittal direction. The detection elements 132 can have at least one energy threshold to suppress (e.g., reject) x-rays having energies above or below the XAS measurement x-ray energy range.

FIG. 10 also schematically illustrates simulation ray tracings of dispersed x-rays 126 downstream from a cylindrically curved Johansson crystal analyzer 120 for a spatially resolving detector 130 at two different positions: (a) on the Rowland circle 150 for a point source target 112 and for an elliptical source target 112, and (b) 50 millimeters inside the Rowland circle 150. The cylindrically curved Johansson crystal analyzer 120 is that of FIG. 5 (having a Rowland circle radius R equal to 300 millimeters and a crystal plane bending radius 2R equal to 600 millimeters), and a set of x-ray energies in a range of 8047 eV to 8054 eV, with each band in FIG. 10 corresponding to a 1 eV energy band and the central band corresponding to x-rays having energies of 8048 eV. The horizontal axis in the three plots of FIG. 10 is the distance in the tangential direction parallel to the Rowland circle 150, the vertical axis is the distance in the sagittal direction, and the dimensions are in millimeters. As seen in FIG. 10, the x-ray energy spread is along the sagittal direction, which is the long dimension of the spatially resolving detector 130. Sub-eV resolution is achieved by using detection elements 132 of sufficiently small size. For an elliptical source, the spatially resolving detector 130 positioned at the Rowland circle 150 can be two-dimensional (2D), and the spatially resolving detector 130 positioned within the Rowland circle 150 can be one-dimensional (1D).

In certain implementations, the apparatus 100 of FIG. 10 comprising the cylindrically curved Johansson crystal analyzer 120 is configured to achieve a given energy resolving power of $(\Delta E/E)^{-1}$ by meeting the following conditions: $2 \cdot R \cdot \sin(\theta) \cdot \Delta E/E \geq \cot(\theta) \cdot S1$ and $2 \cdot R \cdot \sin(\theta) \cdot (\Delta E/E)^{1/2} \geq S2$, where R is the Rowland circle radius, B is the Bragg angle, and S1 and S2 are the x-ray source spot sizes of the target 112 along the tangential direction and the sagittal direction, respectively. The width of the cylindrically curved Johansson crystal analyzer 120 along the sagittal direction can be equal to N·S2, and the cylindrically curved Johansson crystal analyzer 120 can be configured to receive and disperse x-rays 126 along the sagittal direction over an x-ray energy range approximately equal to N times of the energy resolution $\Delta E$ (e.g., N in a range of 2 to 100). The number of detection elements 132 along the sagittal direction can be equal to or greater than N. The spatially resolving detector 130 can be positioned downstream from the crystal analyzer 120 (e.g., at a distance D from a downstream side of the crystal analyzer 120, with the distance D in a range less than 2R (e.g., twice the Rowland circle radius R). For the spatially resolving detector 130 positioned at the Rowland circle 150, the size of the detection elements 132 in the tangential plane can be comparable (e.g., for better signal-to-noise ratio) or can be larger than SI (with potentially lower signal-to-noise ratios due to stray x-rays being measured). For detection elements 132 larger than SI, the spatially resolving detector 130 can comprise a slit aperture at an upstream side of the spatially resolving detector 130 (e.g., between the crystal analyzer 120 and the detection elements 132) to suppress (e.g., reject; reduce) the number of stray x-rays being measured.

Figure 11:
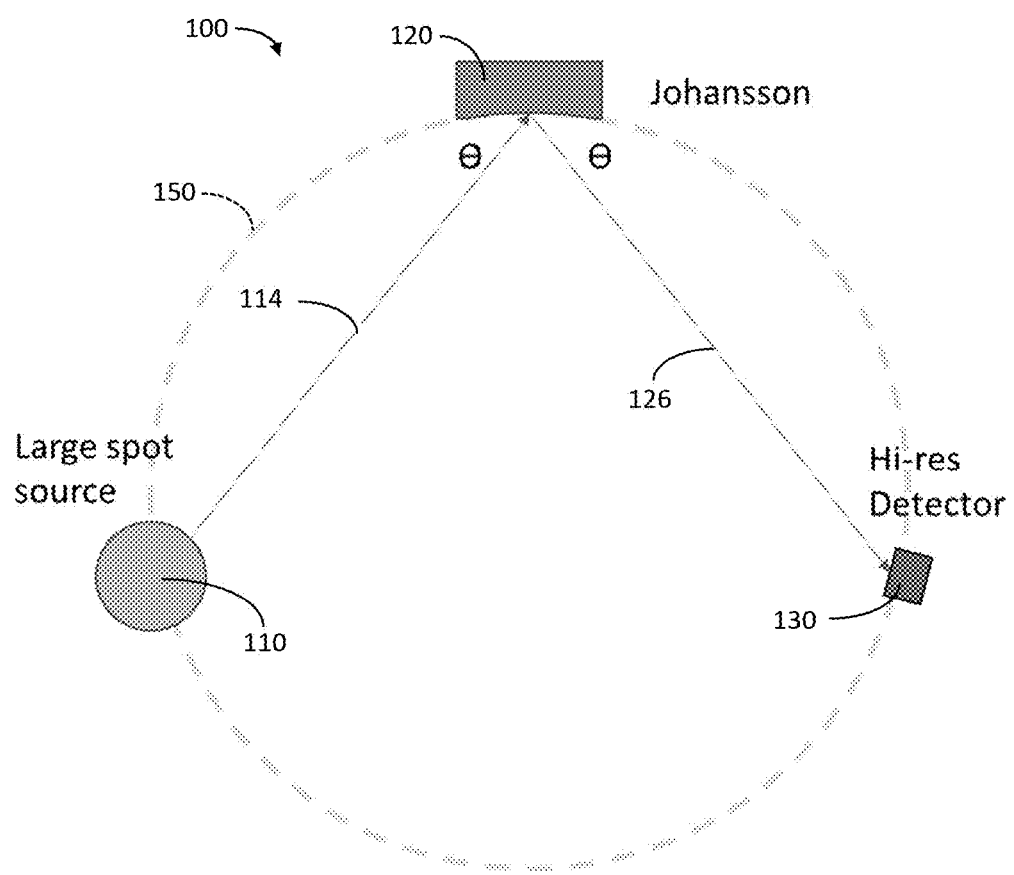
FIG. 11 schematically illustrates another example apparatus configured for XAS measurements in accordance with certain implementations described herein.

FIG. 11 schematically illustrates another example apparatus 100 configured for XAS measurements in accordance with certain implementations described herein. In certain such implementations, the apparatus 100 comprises an x-ray source 110 comprising a target 112 having a large x-ray spot size in the tangential direction, a cylindrically curved Johansson crystal analyzer 120, and a spatially resolving detector 130 with a plurality of detection elements 132 (e.g., 2 to 2000) that are spatially resolving in at least the sagittal direction. The target 112 of the x-ray source 110 can have a linear shape (e.g., a size along the tangential direction in a range of 3 microns to 50 microns and a size along the sagittal direction in a range of 20 microns to 4000 microns), and the x-ray source 110 can comprise multiple target materials. The cylindrically curved Johansson crystal analyzer 120 can comprise a single crystal of Si, Ge, or quartz, can be used at low Bragg angles (e.g., in a range of 15 degrees to 40 degrees), can have a Rowland circle radius R in a range of 50 millimeters to 1000 millimeters, and can have a crystal size less than or equal to 100 millimeters in both the tangential direction and the sagittal direction. The spatially resolving detector 130 can be one-dimensional (1D) or two-dimensional (2D) and comprising at least some detection elements 132 along the sagittal direction. The detection elements 132 can have at least one energy threshold to suppress (e.g., reject) x-rays having energies above or below the XAS measurement x-ray energy range.

In certain implementations, the apparatus 100 of FIG. 11 comprising the cylindrically curved Johansson crystal analyzer 120 is configured to achieve a given energy resolving power of $(\Delta E/E)^{-1}$ by meeting the following conditions: $2 \cdot R \cdot \sin(\theta) \cdot \Delta E/E \geq \cot(\theta) \cdot D1$ and $2 \cdot R \cdot \sin(\theta) \cdot (\Delta E/E)^{1/2} \geq S2$, where R is the Rowland circle radius, B is the Bragg angle, DI is the size of the detection elements 132 along the tangential direction, and S2 is the size along the sagittal direction of the x-ray source spot on the target 112. The width of the cylindrically curved Johansson crystal analyzer 120 along the sagittal direction can be equal to N·S2, and the cylindrically curved Johansson crystal analyzer 120 can be configured to receive and disperse x-rays 126 along the sagittal direction over an x-ray energy range approximately equal to N times of the energy resolution $\Delta E$ (e.g., N in a range of 2 to 100). The number of detection elements 132 along the sagittal direction can be equal to or greater than N. The spatially resolving detector 130 can be positioned downstream from the crystal analyzer 120 (e.g., at a distance D from a downstream side of the crystal analyzer 120, with the distance D in a range less than 2R (e.g., twice the Rowland circle radius R). For the spatially resolving detector 130 with its center positioned at the Rowland circle 150, the size D2 of the detection elements 132 along the sagittal direction can be smaller than S2. For detection elements 132 with D1 larger than $2 \cdot R \cdot \sin(\theta) \cdot \Delta E/E/\cot(\theta)\cdot$, the spatially resolving detector 130 can comprise a slit aperture at an upstream side of the spatially resolving detector 130 (e.g., between the crystal analyzer 120 and the detection elements 132) and having a long dimension of the slit aperture aligned along the sagittal direction to suppress (e.g., reject; reduce) the number of stray x-rays being measured.

In certain implementations, the apparatus 100 comprises an x-ray source 110 comprising a target 112 having a small x-ray spot size in the tangential direction, a spherically curved Johansson crystal analyzer 120, and a spatially resolving detector 130 with a plurality of detection elements 132 (e.g., 2 to 2000) that are spatially resolving in at least the sagittal direction. The target 112 of the x-ray source 110 can have a size along the tangential direction in a range of 3 microns to 50 microns and a size along the sagittal direction in a range of 20 microns to 1000 microns, and the x-ray source 110 can comprise multiple target materials. The spherically curved Johansson crystal analyzer 120 can comprise a single crystal of Si, Ge, or quartz, can have a Rowland circle radius R in a range of 50 millimeters to 1000 millimeters, and can have a crystal size less than or equal to 100 millimeters in both the tangential direction and the sagittal direction. The spatially resolving detector 130 can be one-dimensional (1D) or two-dimensional (2D) and comprising at least some detection elements 132 along the sagittal direction. The detection elements 132 can have at least one energy threshold to suppress (e.g., reject) x-rays having energies above or below the XAS measurement x-ray energy range.

In certain implementations, the apparatus 100 comprising the spherically curved Johansson crystal analyzer 120 is configured to achieve a given energy resolving power of $(\Delta E/E)^{-1}$ by meeting the following conditions: $2 \cdot R \cdot \sin(\theta) \cdot \Delta E/E \leq \cot(\theta)$. SI and $2 \cdot R \cdot \sin^2(\theta) \cdot (\Delta E/E)^{1/2} \geq S2$, where R is the Rowland circle radius, Bis the Bragg angle, and SI and S2 are the sizes of the x-ray source spot on the target 112 along the tangential direction and the sagittal direction, respectively. The spatially resolving detector 130 can be positioned downstream from the crystal analyzer 120 (e.g., at a distance D from a downstream side of the crystal analyzer 120, with the distance D in a range less than 2R (e.g., twice the Rowland circle radius R). The detection elements 132 can be configured to measure dispersed x-rays 126 received by the spatially resolving detector 130 along the tangential direction. In certain implementations, the spatially resolving detector 130 is a one-dimensional (1D) position sensitive detector positioned close to the crystal analyzer 120 (e.g., within the Rowland circle 150) with the detection elements 132 aligned along the tangential direction, while in certain other implementations, the spatially resolving detector 130 is a two-dimensional (2D) position sensitive detector positioned close to the Rowland circle 150 (e.g., on the Rowland circle 150).

Figure 12:
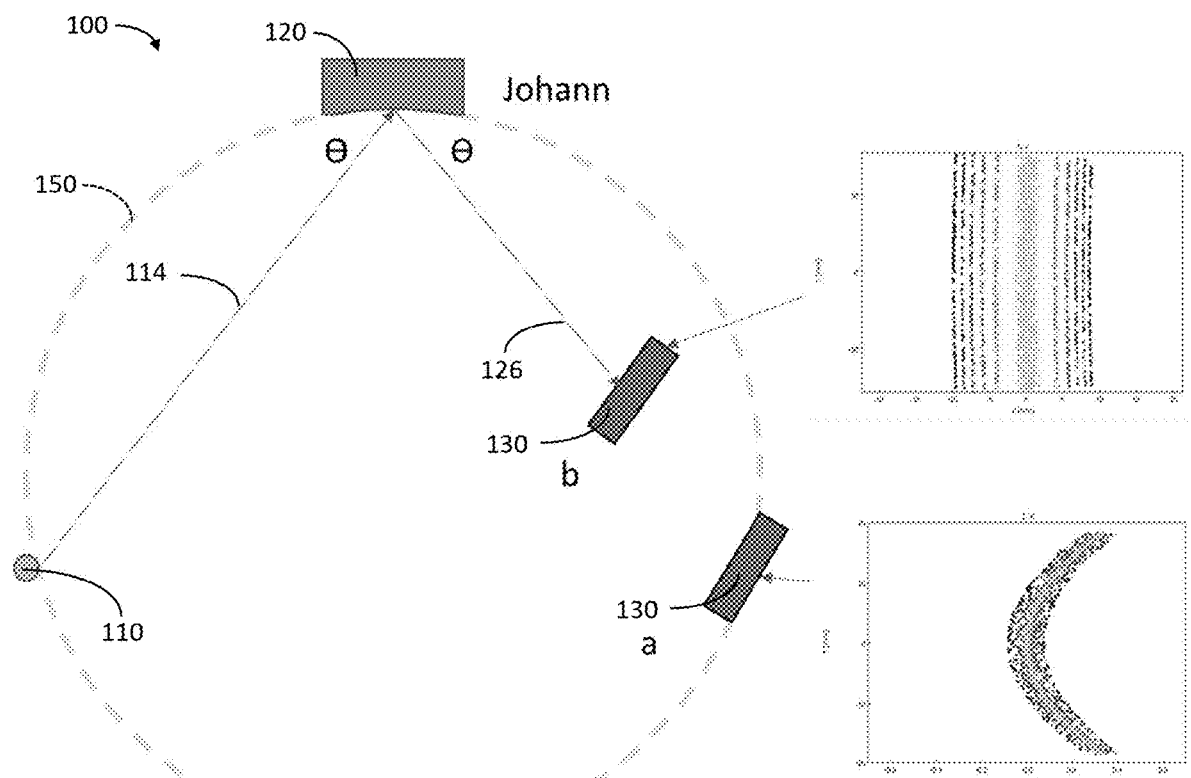
FIG. 12 schematically illustrates another example apparatus configured for XAS measurements in accordance with certain implementations described herein.

FIG. 12 schematically illustrates another example apparatus 100 configured for XAS measurements in accordance with certain implementations described herein. In certain such implementations, the apparatus 100 comprises an x-ray source 110, a spherically curved Johann crystal analyzer 120, and a spatially resolving detector 130 with a plurality of detection elements 132. FIG. 12 also schematically illustrates simulation ray tracings of dispersed x-rays 126 downstream from the spherically curved Johann crystal analyzer 120 for a spatially resolving detector 130 at two different positions: (a) on the Rowland circle 150 and (b) 200 millimeters inside the Rowland circle 150. The spherically curved Johann crystal analyzer 120 has a Rowland circle radius R equal to 300 millimeters and a crystal plane bending radius 2R equal to 600 millimeters. The set of x-ray energies of the bands in FIG. 12 are in a range of 8028 eV to 8052 eV, with each band in FIG. 12 corresponding to a 1 eV energy band and the central band corresponding to x-rays having energies of 8048 eV. For the spatially resolving detector 130 positioned on the Rowland circle 150, the dispersion of the range of x-ray energies is only over about 400 microns and spectral blurring can occur that degrades the energy resolution of the measured XAS spectra. For the spatially resolving detector 130 positioned 200 millimeters inside the Rowland circle, the corresponding x-ray energy dispersion stretches over a few millimeters and can be resolved using a pixelated detector. Energy dispersion is achieved in certain implementations by placing the spatially resolving detector 130 sufficiently far from the focal point on the Rowland circle 150 (e.g., either inside the Rowland circle 150 or outside the Rowland circle 150).

Figure 13A:
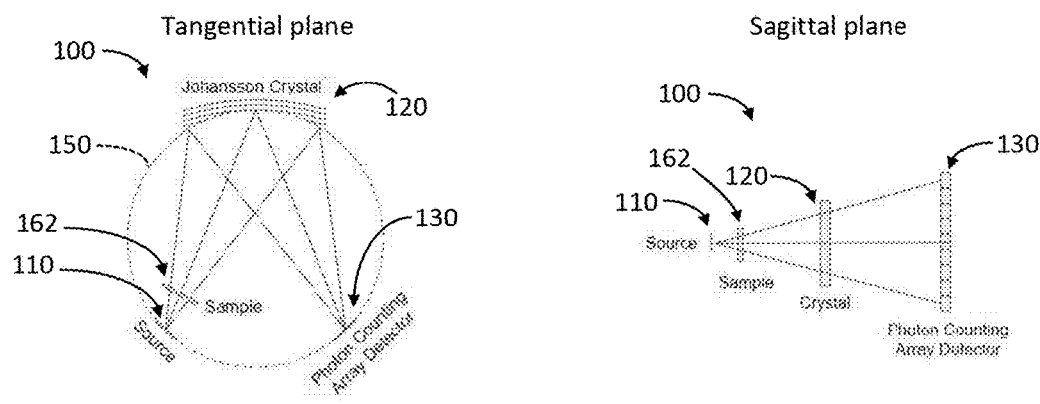
FIG. 13A schematically illustrates the tangential plane and the sagittal plane of an example apparatus configured to have the sample between the x-ray source and the crystal analyzer in accordance with certain implementations described herein.
Figure 13B:
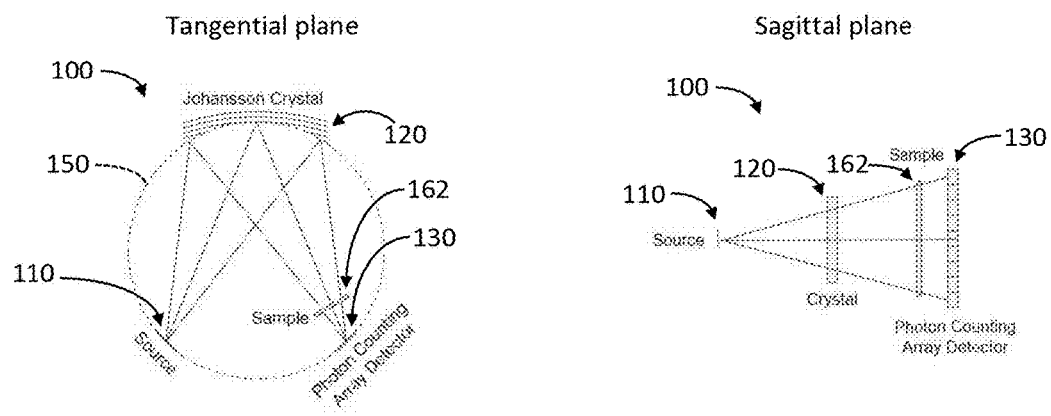
FIG. 13B schematically illustrates the tangential plane and the sagittal plane of an example apparatus configured to have the sample between the crystal analyzer and the spatially resolving detector in accordance with certain implementations described herein.

In certain implementations, the x-ray energy illuminating a sample 162 can vary depending on the location of the sample 162. FIG. 13A schematically illustrates the tangential plane and the sagittal plane of an example apparatus 100 configured to have the sample 162 between the x-ray source 110 and the crystal analyzer 120 in accordance with certain implementations described herein. FIG. 13B schematically illustrates the tangential plane and the sagittal plane of an example apparatus 100 configured to have the sample 162 between the crystal analyzer 120 and the spatially resolving detector 130 in accordance with certain implementations described herein. For the example apparatus 100 of FIGS. 13A and 13B, the detection elements 132 of the spatially resolving detector 130 can measure x-ray absorption corresponding to a respective region of the sample 162. In certain implementations, by scanning the x-ray energy over a sufficiently large range, a spectral image of the sample 162 can be obtained (e.g., x-ray imaging spectroscopy).

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," "less than," "between," and the like includes the number recited. As used herein, the meaning of "a," "an," and "said" includes plural reference unless the context clearly dictates otherwise. While the structures and/or methods are discussed herein in terms of elements labeled by ordinal adjectives (e.g., first, second, etc.), the ordinal adjectives are used merely as labels to distinguish one element from another, and the ordinal adjectives are not used to denote an order of these elements or of their use.

Various configurations have been described above. It is to be appreciated that the implementations disclosed herein are not mutually exclusive and may be combined with one another in various arrangements. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. An apparatus comprising:
    an x-ray source comprising a target configured to generate x-rays upon bombardment by electrons;
    a crystal analyzer positioned relative to the x-ray source on a Rowland circle in a tangential plane and having a Rowland circle radius (R), the crystal analyzer comprising crystal planes curved along at least one direction within at least the tangential plane with a radius of curvature substantially equal to twice the Rowland circle radius (2R), the crystal planes configured to receive x-rays from the x-ray source and to disperse the received x-rays according to Bragg's law; and
    a spatially resolving detector configured to receive at least a portion of the dispersed x-rays, the spatially resolving detector comprising a plurality of x-ray detection elements having a tunable first x-ray energy and/or a tunable second x-ray energy, the plurality of x-ray detection elements configured to measure received dispersed x-rays having x-ray energies below the first x-ray energy while suppressing measurements of the received dispersed x-rays above the first x-ray energy and/or to measure the received dispersed x-rays having x-ray energies above the second x-ray energy while suppressing measurements of the received dispersed x-rays below the second x-ray energy, the first and second x-ray energies tunable in a range of 1.5 keV to 30 keV.

2. The apparatus of claim 1, further comprising at least one stage configured to position the crystal analyzer with respect to the x-ray source on the Rowland circle, to align the at least one direction of the crystal planes to the tangential plane, and to position the spatially resolving detector at a distance D, wherein the at least one stage is configured to rotate the crystal analyzer over a predetermined angular range while the relative positions of the x-ray source, the crystal analyzer, and the spatially resolving detector are changed to maintain Rowland circle geometry.

3. The apparatus of claim 1, further comprising a sample stage configured to position a sample for analysis either between the x-ray source and the crystal analyzer or between the crystal analyzer and the spatially resolving detector.

4. The apparatus of claim 1, wherein the spatially resolving detector is positioned inside the Rowland circle.

5. The apparatus of claim 1, wherein the spatially resolving detector is positioned on the Rowland circle.

6. The apparatus of claim 1, wherein the spatially resolving detector is positioned outside the Rowland circle.

7. The apparatus of claim 1, wherein the first and second x-ray energies differ from one another by an energy in a range of 50 eV to 5 keV.

8. The apparatus of claim 1 wherein the spatially resolving detector is a one-dimensional or two-dimensional pixel array detector.

9. The apparatus of claim 1, wherein the spatially resolving detector is a pixel array photon counting detector having an energy resolution better than 3 keV.

10. The apparatus of claim 9, wherein the pixel array photon counting detector is a direct-conversion solid state x-ray detector, selected from the group consisting of: hybrid x-ray detector, CCD detector, and CMOS detector.

11. The apparatus of claim 1, wherein each x-ray detection element of the plurality of x-ray detection elements has a linear dimension between 3 microns to 2 millimeters.

12. The apparatus of claim 1, wherein the dispersed x-rays have an energy bandwidth in a range of 2 eV to 250 eV along at least one direction perpendicular to or parallel to the tangential plane.

13. The apparatus of claim 1, wherein the crystal analyzer is selected from a group consisting of: a cylindrically curved Johansson crystal analyzer, a spherically curved Johansson crystal analyzer, a spherically curved Johann crystal analyzer, a cylindrically curved Johann crystal analyzer, and an analyzer with Wittry geometry.

14. The apparatus of claim 1, wherein the Rowland circle radius is in a range of 50 millimeters to 1000 millimeters.

15. The apparatus of claim 1, wherein the crystal analyzer comprises a single crystal material selected from the group consisting of: silicon, germanium, and quartz.

16. The apparatus of claim 1, wherein at least three x-ray detection elements of the plurality of x-ray detection elements are configured to measure at least some dispersed x-rays along a direction perpendicular to the tangential plane.

17. The apparatus of claim 1, wherein at least three x-ray detection elements of the plurality of x-ray detection elements are configured to measure at least some dispersed x-rays along a direction parallel to the tangential plane.

18. The apparatus of claim 1, wherein the target of the x-ray source comprises one or more x-ray generating target materials selected from the group consisting of: Cr, Fe, Co, Ni, Cu, Mo, Rh, Pd, Ag, Ta, W, and Au.

19. The apparatus of claim 18, wherein the target of the x-ray source comprises a diamond substrate and the one or more x-ray generating target materials are embedded on or within the diamond substrate.

20. The apparatus of claim 1, wherein the x-ray source has an effective source size less than 50 microns in a direction parallel to the tangential plane.

21. The apparatus of claim 1, wherein the x-ray source has an effective source size in a range of 20 to 4000 microns in a direction perpendicular to the tangential plane.

22. The apparatus of claim 1, further comprising an aperture between the crystal analyzer and the spatially resolving detector.

23. The apparatus of claim 22, wherein the aperture is a slit aperture having a width in a range of 3 microns to 1000 microns.

24. The apparatus of claim 1, further comprises a beam stop configured to prevent x-rays from the x-ray source that are not diffracted by the crystal analyzer from being received by the plurality of x-ray detection elements.

25. The apparatus of claim 1, further comprising a computer system configured to analyze signals generated by the plurality of x-ray detection elements, to respond to the signals by generating an x-ray spectrum of x-ray flux as a function of x-ray energy, and to convert x-ray spectra obtained with different first and/or second x-ray energies to a single combined x-ray spectrum.

26. The apparatus of claim 1, further comprising a computer system configured to record x-ray absorption spectra measured by one or more of the x-ray detection elements of the plurality of x-ray detection elements and to produce a spectroscopic image of a sample under analysis.

27. A fluorescence mode x-ray absorption spectroscopy apparatus comprising a source of x-rays, a crystal, and a detector, the source and the crystal defining a Rowland circle, the apparatus configured to receive a sample at a focal point of the Rowland circle with the detector facing a surface of the sample.

28. A method comprising:
collecting an XANES spectrum;
collecting an EXAFS spectrum having coarser resolution than does the XANES spectrum, wherein the EXAFS spectrum overlaps the XANES spectrum in an energy region of at least 30 eV; and
normalizing the XANES spectrum and the EXAFS spectrum to one another in the energy region and replacing the EXAFS spectrum in the energy region with the XANES spectrum in the energy region to generate a combined spectrum.

29. The method of claim 28, wherein collecting the XANES spectrum comprises collecting sagittal dispersed spectra at a fixed Bragg angle and varying Bragg angles over a predetermined angular range.

30. The method of claim 28, wherein collecting the EXAFS spectrum comprises collecting sagittal dispersed spectra at a fixed Bragg angle and varying Bragg angles over a predetermined angular range, the combined spectrum having a spectral coverage (M) equal to a detector energy resolution divided by a detector energy bandwidth, the spectral coverage greater than 400.

31. The method of claim 30, wherein the EXAFS spectrum has an energy resolution at least twice as large as an energy resolution of the XANES spectrum.

* * * * *

UNITED STATES PATENT AND TRADEMARK OFFICE
CERTIFICATE OF CORRECTION

PATENT NO. : 11,215,572 B2
APPLICATION NO. : 17/320852
DATED : January 4, 2022
INVENTOR(S) : Wenbing Yun et al.

It is certified that error appears in the above-identified patent and that said Letters Patent is hereby corrected as shown below:

In the Specification

Column 13, Line 35, delete "$(\Delta E/E)^{1/2} \cdot \cot(\theta),$" and insert --$(\Delta E/E)^{-1/2} \cdot \cot(\theta),$--.

Column 13, Line 41, delete "$\sin(G).$" and insert --$\sin(\theta).$--.

Column 17, Line 64, delete "SI" and insert --S1--.

Column 17, Line 65, delete "Bis" and insert --$\theta$ is--.

Column 17, Line 66, delete "SI" and insert --S1--.

Column 18, Line 17, delete "SI" and insert --S1--.

Column 18, Line 19, delete "SI," and insert --S1,--.

Column 18, Line 56, delete "$\sin(\theta). (\Delta E/E)^{1/2} \geq S2,$" and insert --$\sin(\theta) \cdot (\Delta E/E)^{1/2} \geq S2,$--.

Column 18, Line 57, delete "Bis" and insert --$\theta$ is--.

Column 19, Line 44, delete "$\cot(\theta) \cdot SI$" and insert --$\cot(\theta) \cdot S1$--.

Column 19, Line 45, delete "Bis" and insert --$\theta$ is--.

Column 19, Line 45, delete "SI" and insert --S1--.

Column 21, Line 27, delete "less than,"" and insert --"less than,"--.

Signed and Sealed this
Nineteenth Day of April, 2022

Katherine Kelly Vidal
*Director of the United States Patent and Trademark Office*